US012475911B2

(12) United States Patent
Serra et al.

(10) Patent No.: US 12,475,911 B2
(45) Date of Patent: Nov. 18, 2025

(54) METHOD FOR LEARNING AN AUDIO QUALITY METRIC COMBINING LABELED AND UNLABELED DATA

(71) Applicant: Dolby International AB, Dublin (IE)

(72) Inventors: Joan Serra, Barcelona (ES); Jordi Pons Puig, Barcelona (ES); Santiago Pascual, Barcelona (ES)

(73) Assignee: Dolby International AB, Dublin (IE)

( * ) Notice: Subject to any disclaimer, the term of this patent is extended or adjusted under 35 U.S.C. 154(b) by 343 days.

(21) Appl. No.: 18/012,256

(22) PCT Filed: Jun. 21, 2021

(86) PCT No.: PCT/EP2021/066786
§ 371 (c)(1),
(2) Date: Dec. 22, 2022

(87) PCT Pub. No.: WO2021/259842
PCT Pub. Date: Dec. 30, 2021

(65) Prior Publication Data

US 2023/0245674 A1 Aug. 3, 2023

Related U.S. Application Data

(60) Provisional application No. 63/090,919, filed on Oct. 13, 2020, provisional application No. 63/072,787, filed on Aug. 31, 2020.

(30) Foreign Application Priority Data

Jun. 22, 2020 (ES) ............................... ES202030605
Oct. 22, 2020 (EP) ..................................... 20203277

(51) Int. Cl.
*G10L 25/30* (2013.01)
*G10L 25/60* (2013.01)

(52) U.S. Cl.
CPC .............. *G10L 25/30* (2013.01); *G10L 25/60* (2013.01)

(58) Field of Classification Search
CPC .......... G10L 25/30; G10L 25/60; G10L 25/69
See application file for complete search history.

(56) References Cited

U.S. PATENT DOCUMENTS 7,164,771 B1 1/2007 Treurniet
8,824,783 B2 9/2014 Xu
(Continued)

FOREIGN PATENT DOCUMENTS

CN 111081278 A 4/2020
CN 109979486 B 7/2021
(Continued)

OTHER PUBLICATIONS

Manocha. P. et al. "A differentiable Perceptual Audio Metric Learned from Just Noticeable Differences" Arxiv. Org. Cornell University Library, Jan. 13, 2020 (Year: 2020).*
(Continued)

*Primary Examiner* — Douglas Godbold
*Assistant Examiner* — Cameron Kenneth Young

(57) ABSTRACT

Described is a method of training a neural-network-based system for determining an indication of an audio quality of an audio input. The method includes obtaining, as input, at least one training set comprising audio samples. The audio samples include audio samples of a first type and audio samples of a second type, wherein each of the first type of audio samples is labelled with information indicative of a respective predetermined audio quality metric, and wherein each of the second type of audio samples is labelled with information indicative of a respective audio quality metric relative to that of a reference audio sample. The method further includes: inputting the training set to the neural-
(Continued)

network-based system; and iteratively training the system to predict the respective label information of the audio samples in the training set.

17 Claims, 15 Drawing Sheets

(56) References Cited

U.S. PATENT DOCUMENTS

| | | | | |
|---|---|---|---|---|
| 10,283,142 | B1 * | 5/2019 | Yu | G10L 25/30 |
| 11,646,009 | B1 * | 5/2023 | Chhetri | G10L 15/16 704/232 |
| 2004/0186715 | A1 * | 9/2004 | Gray | G10L 25/69 704/E19.002 |
| 2004/0186716 | A1 * | 9/2004 | Morfitt, III | G10L 25/48 704/E11.002 |
| 2009/0238370 | A1 * | 9/2009 | Rumsey | H04R 29/00 381/58 |
| 2014/0358526 | A1 * | 12/2014 | Abdelal | H04L 65/80 704/202 |
| 2015/0120289 | A1 | 4/2015 | Lev-Tov | |
| 2019/0172479 | A1 | 6/2019 | Xiao | |
| 2019/0355347 | A1 | 11/2019 | Arik | |
| 2020/0022007 | A1 * | 1/2020 | Ouyang | G10L 15/26 |
| 2020/0227070 | A1 | 7/2020 | Kim | |
| 2020/0402530 | A1 * | 12/2020 | Güzelarslan | H04M 3/2236 |
| 2021/0312939 | A1 * | 10/2021 | Uhle | G10L 25/30 |
| 2021/0350820 | A1 * | 11/2021 | Wu | G10L 25/30 |
| 2021/0360349 | A1 * | 11/2021 | Nyayate | G10L 25/84 |
| 2022/0230645 | A1 * | 7/2022 | Xu | G10L 19/24 |

FOREIGN PATENT DOCUMENTS

| | | | |
|---|---|---|---|
| CN | 110277106 | B | 10/2021 |
| EP | 2143104 | A2 | 1/2010 |
| JP | H04345327 | A | 12/1992 |
| JP | H09331391 | A | 12/1997 |
| JP | 2000506327 | A | 5/2000 |
| JP | 2019531494 | A | 10/2019 |
| WO | 2018028767 | A1 | 2/2018 |

OTHER PUBLICATIONS

AutoMOS (B. Patton, Y. Agiomyrgiannakis, M. Terry, K. Wilson, R. A. Saurous, and D. Sculley, "AutoMOS: learning a non-intrusive assessor of naturalness-of-speech," in NIPS16 End-to-end Learning for Speech and Audio Processing Workshop, 2016.

Avila, A. R. et al, Non-intrusive Speech Quality Assessment Using Neural Networks, ICASSP 2019—2019 IEEE International Conference on Acoustics, Speech and Signal Processing (ICASSP), May 12, 2019, pp. 631-635, DOI: 10.1109/ICASSP.2019.8683175, IEEE, Brighton, UK.

Falk, T. H. et al "A non-intrusive quality and intelligibility measure of reverberant and dereverberated speech," IEEE Trans. on Audio, Speech, and Language Processing, vol. 18, No. 7, pp. 1766-1774, 2010).

Fonseca, E. et al "Learning sound event classifiers from web audio with noisy labels," ArXiv: 1901.01189, 2019.

Gamper, H. et al, Intrusive and Non-Intrusive Perceptual Speech Quality Assessment Using a Convolutional Neural Network, IEEE Workshop on Applications of Signal Processing to Audio and Acoustics (WASPAA), Oct. 20, 2019, 85-89, DOI: 10.1109/WASPAA.2019.8937202, IEEE, New Paltz, New York, USA.

Harte, N. et al "TCD-VoIP, a Research Database of Degraded Speech for Assessing Quality in VoIP Applications" IEEE published 2015 Seventh International Workshop on Quality of Multimedia Experience, May 26-29, 2015.

ITU-P563 (L. Malfait, J. Berger, and M. Kastner, "PP.563—The ITU-T standard for single-ended speech quality assessment," IEEE Trans. On Audio, Speech and Language Processing, vol. 14, No. 6, pp. 1924-1934, Nov. 2006.

ITU-T P.800 Series P: Telephone Transmission Quality "Methods for Subjective Determination of Transmission Quality" Aug. 1996.

Liu, X. et al "RankIQA: Learning from Rankings for No-Reference Image Quality Assessment" IEEE International Conference on Computer Vision, Oct. 22-29, 2017.

Ma, K. et al "dipIQ: Blind Image Quality Assessment by Learning-to-Rank Discriminable Image Pairs" Computer science, Computer Vision and Pattern Recognition, Apr. 2019.

Manocha, P. et al "A Differentiable Perceptual Audio Metric Learned from Just Noticeable Differences" Arxiv. Org. Cornell University Library, May 18, 2020.

Manocha, P. et al "A Differentiable Perceptual Audio Metrix Learned from Just Noticeable Differences" Arxiv. Org. Cornell University Library, Jan. 13, 2020.

Nisqa (G. Mittag and S. Möller, "Non-intrusive speech quality assessment for super-wideband speech communication networks," in Proc. of the IEEE Int. Conf. on Acoustics, Speech and Signal Processing (ICASSP), 2019, pp. 7125-7129).

P.C. Loizou, "Speech Quality Assessment" Multimedia Analysis, Processing and Communications, ser. Studies in Computational Intelligence, Berlin, Germany: Springer, 2011, vol. 346, pp. 623-654.

Pascual, S. et al "Learning Problem-Agnostic Speech Representations from Multiple Self-Supervised Tasks" Arxiv Org. Cornelll University Library, Apr. 6, 2019.

Piczak, K.J. "ESC: dataset for environmental sound classification," in Proc. of the ACM Conf. on Multimedia (ACM-MM), 2015, pp. 1015-1018.

Quality-Net (S.-W. Fu, Y. Tsao, H.-T. Hwang, and H.-M. Wang, "Quality-Net: an end-to-end non-intrusive speech quality assessment model based on BLSTM," in Proc. of the Int. Speech Comm. Assoc. Conf. (Interspeech), 2018, pp. 1873-1877).

Ravdess (S. R. Livingstone and F. A. Russo, "The Ryerson audio-visual database of emotional speech and song (Ravdess)," PLoS One, vol. 13, No. 5, p. e0196391, 2018. [Online]. Available: https://zenodo:org/record/1188976).

Serra, J. "SESQA: Semi-Supervised Learning for Speech Quality Assessment" ARXIV ORG Cornell University Library, Oct. 1, 2020, pp. 9-11.

Shan, Y. et al, Non-intrusive Speech Quality Assessment Using Deep Belief Network and Backpropagation Neural Network, 2018 11th International Symposium on Chinese Spoken Language Processing (ISCSLP), Nov. 2018, pp. 71-75, DOI: 10.1109/ISCSLP.2018.8706696, IEEE, Taipei, Taiwan.

Kabal, Peter "TSP Speech Database" Telecommunications and Signal Processing Laboratory, McGill Version, 2018.

VCTK (Y. Yamagishi, C. Veaux, and K. MacDonald, "CSTR VCTK Corpus: English Multi-speaker Corpus for CSTR Voice cloning toolkit (version 0.92)," University of Edinburgh, The Centre for Speech and Technology Research (CSTR), 2019. [Online]. Available: https://doi:org/10:7488/ds/2645.

WEnets (A. A. Catellier and S. D. Voran, "WEnets: a convolutional framework for evaluating audio waveforms," ArXiv:1909.09024, 2019.

Pascual, et al., "Learning problem-agnostic speech representations from multiple self-supervised tasks", INTERSPEECH 2019, Graz, Austria, Sep. 15-19, 2019, 5 Pages.

Li Hongtao, "Objective Evaluation Technology and System Development for Speech Quality", A Dissertation Submitted for the Degree of Master, South China University of Technology, Guangzhou, China, Jun. 6, 2017, 89 Pages.

* cited by examiner

| APPROACH | $L^{MOS}$ | $R^{RANK}$ | $L^{CONS}$ | $E^{TOTAL}$ |
|---|---|---|---|---|
| HUMAN | 0.679 | N/A | N/A | N/A |
| RANDOM SCORE | 1.219 | 0.500 | 0.614 | 1.724 |
| ITU-P563 | 0.982 | 0.498 | 0.050 | 1.042 |
| FL-JND | 0.899 | 0.365 | 0.093 | 0.908 |
| SRMR | 0.854 | 0.351 | 0.071 | 0.849 |
| FL-PASE | 0.735 | 0.324 | 0.105 | 0.796 |
| AutoMOS | 0.537 | 0.311 | 0.212 | 0.792 |
| Quality-Net | 0.657 | 0.349 | 0.087 | 0.765 |
| WEnet | 0.660 | 0.258 | 0.125 | 0.713 |
| NISQA | 0.556 | 0.243 | 0.123 | 0.644 |
| CNN-ELM | 0.511 | 0.220 | 0.145 | 0.621 |
| OURS | 0.474 | 0.090 | 0.067 | 0.394 |

FIG. 8A

| APPROACH | $L^{MOS}$ | $R^{RANK}$ | $L^{CONS}$ | $E^{TOTAL}$ |
|---|---|---|---|---|
| OURS | 0.474 | 0.090 | 0.067 | 0.394 |
| WITHOUT $L^{MOS}$ | 0.839 | 0.079 | 0.044 | 0.543 |
| WITHOUT $L^{RANK}$ | 0.492 | 0.201 | 0.061 | 0.508 |
| WITHOUT $L^{CONS}$ | 0.441 | 0.096 | 0.130 | 0.447 |
| WITHOUT $L^{SD}$ | 0.482 | 0.091 | 0.067 | 0.399 |
| WITHOUT $L^{JND}$ | 0.475 | 0.089 | 0.067 | 0.394 |
| WITHOUT $L^{DT}$ | 0.476 | 0.089 | 0.067 | 0.394 |
| WITHOUT $L^{DS}$ | 0.479 | 0.090 | 0.067 | 0.396 |
| WITHOUT $L^{MR}$ | 0.488 | 0.093 | 0.066 | 0.403 |
| ONLY $L^{MOS}$ | 0.480 | 0.265 | 0.137 | 0.643 |

FIG. 8B

| APPROACH | $L^{MOS}$ (STD) | ρP | ρS |
|---|---|---|---|
| HUMAN | 0.62 (N/A) | 0.87 | 0.86 |
| RANDOM SCORE | 1.18 (0.87) | 0.15 | 0.16 |
| FL-JND | 1.19 (0.80) | 0.01 | 0.30 |
| ITU-P563 | 0.92 (0.50) | 0.05 | 0.04 |
| SRMR | 0.83 (0.78) | 0.25 | 0.31 |
| NISQA | 0.74 (0.68) | 0.61 | 0.60 |
| FL-PASE | 0.64 (0.55) | 0.63 | 0.67 |
| Quality-Net | 0.64 (0.50) | 0.82 | 0.78 |
| WEnet | 0.55 (0.44) | 0.74 | 0.72 |
| AutoMOS | 0.48 (0.45) | 0.82 | 0.82 |
| CNN-ELM | 0.47 (0.37) | 0.84 | 0.81 |
| OURS | 0.37 (0.34) | 0.87 | 0.89 |

FIG. 8C

| APPROACH | INTERNAL UGC | | | INTERNAL VoIP | | | TCD-VoIP | | | AVERAGE |
|---|---|---|---|---|---|---|---|---|---|---|
| | $L^{MOS}$ | $R^{RANK}$ | $L^{CONS}$ | $L^{MOS}$ | $R^{RANK}$ | $L^{CONS}$ | $L^{MOS}$ | $R^{RANK}$ | $L^{CONS}$ | $E^{TOTAL}$ |
| HUMAN | 0.510 | N/A | N/A | 0.755 | N/A | N/A | 0.772 | N/A | N/A | N/A |
| RANDOM SCORE | 1.481 | 0.500 | 0.747 | 1.033 | 0.499 | 0.516 | 1.144 | 0.501 | 0.580 | 1.724 |
| ITU-P563 | 1.304 | 0.501 | 0.050 | 0.752 | 0.501 | 0.050 | 0.890 | 0.501 | 0.050 | 1.042 |
| FL-JND | 0.981 | 0.363 | 0.106 | 0.768 | 0.411 | 0.078 | 0.948 | 0.321 | 0.095 | 0.908 |
| SRMR | 0.995 | 0.283 | 0.110 | 0.743 | 0.487 | 0.049 | 0.825 | 0.282 | 0.053 | 0.849 |
| FL-PASE | 0.798 | 0.291 | 0.126 | 0.720 | 0.348 | 0.074 | 0.686 | 0.333 | 0.114 | 0.796 |
| AutoMOS | 0.532 | 0.293 | 0.236 | 0.536 | 0.292 | 0.250 | 0.542 | 0.349 | 0.151 | 0.792 |
| Quality-Net | 0.695 | 0.271 | 0.077 | 0.657 | 0.319 | 0.075 | 0.620 | 0.418 | 0.110 | 0.765 |
| WEnet | 0.702 | 0.211 | 0.142 | 0.690 | 0.274 | 0.085 | 0.587 | 0.290 | 0.147 | 0.713 |
| NISQA | 0.543 | 0.209 | 0.138 | 0.530 | 0.184 | 0.106 | 0.594 | 0.335 | 0.125 | 0.644 |
| CNN-ELM | 0.528 | 0.184 | 0.161 | 0.511 | 0.176 | 0.130 | 0.493 | 0.301 | 0.144 | 0.621 |
| OURS | 0.485 | 0.096 | 0.089 | 0.513 | 0.086 | 0.057 | 0.424 | 0.089 | 0.056 | 0.394 |

FIG. 8D

| APPROACH | INTERNAL UGC | | | INTERNAL VoIP | | | TCD-VoIP | | | AVERAGE $E^{TOTAL}$ |
|---|---|---|---|---|---|---|---|---|---|---|
| | $L^{MOS}$ | $R^{RANK}$ | $L^{CONS}$ | $L^{MOS}$ | $R^{RANK}$ | $L^{CONS}$ | $L^{MOS}$ | $R^{RANK}$ | $L^{CONS}$ | |
| OURS | 0.485 | 0.096 | 0.089 | 0.513 | 0.086 | 0.057 | 0.424 | 0.089 | 0.056 | 0.394 |
| WITHOUT $L^{MOS}$ | 1.106 | 0.078 | 0.044 | 0.700 | 0.074 | 0.044 | 0.711 | 0.085 | 0.044 | 0.543 |
| WITHOUT $L^{RANK}$ | 0.496 | 0.124 | 0.081 | 0.544 | 0.277 | 0.050 | 0.437 | 0.202 | 0.051 | 0.508 |
| WITHOUT $L^{CONS}$ | 0.449 | 0.098 | 0.154 | 0.464 | 0.086 | 0.117 | 0.411 | 0.104 | 0.120 | 0.447 |
| WITHOUT $L^{SD}$ | 0.491 | 0.099 | 0.087 | 0.517 | 0.083 | 0.057 | 0.437 | 0.090 | 0.057 | 0.399 |
| WITHOUT $L^{JND}$ | 0.484 | 0.096 | 0.089 | 0.516 | 0.086 | 0.057 | 0.421 | 0.086 | 0.055 | 0.394 |
| WITHOUT $L^{DT}$ | 0.482 | 0.097 | 0.088 | 0.523 | 0.082 | 0.056 | 0.422 | 0.089 | 0.057 | 0.394 |
| WITHOUT $L^{DS}$ | 0.484 | 0.096 | 0.088 | 0.524 | 0.084 | 0.056 | 0.429 | 0.089 | 0.057 | 0.396 |
| WITHOUT $L^{MR}$ | 0.500 | 0.104 | 0.086 | 0.532 | 0.083 | 0.056 | 0.433 | 0.092 | 0.056 | 0.403 |
| ONLY $L^{MOS}$ | 0.478 | 0.208 | 0.163 | 0.529 | 0.268 | 0.116 | 0.434 | 0.320 | 0.132 | 0.643 |

FIG. 8E

| METHOD | GLOBAL AVERAGE | INTERNAL 0 | | | | INTERNAL 1 | | | | TCD-VoIP | | | | |
|---|---|---|---|---|---|---|---|---|---|---|---|---|---|---|
| | | AVERAGE | Er | Ec | Es | AVERAGE | Er | Ec | Es | AVERAGE | Er | Ec | Es | |
| HUMAN | | | | | 0.510 | | | | 0.755 | | | | 0.772 | |
| DUMMY (PREDICT THE MEAN) | **0.963** | 1.009 | 0.500 | 0.050 | 0.918 | 0.902 | 0.500 | 0.050 | 0.704 | 0.977 | 0.500 | 0.050 | 0.854 | |
| DUMMY (SAMPLE FROM SEEN SCORES) | **1.627** | 1.739 | 0.500 | 0.623 | 1.232 | 1.494 | 0.500 | 0.498 | 0.991 | 1.649 | 0.501 | 0.579 | 1.137 | |
| ITU-P563 | **1.018** | 1.090 | 0.501 | 0.050 | 1.077 | 0.932 | 0.498 | 0.070 | 0.728 | 1.032 | 0.496 | 0.082 | 0.907 | |
| FEATURE LOSS - JND PAPER | **0.920** | 0.944 | 0.427 | 0.101 | 0.832 | 0.918 | 0.481 | 0.064 | 0.745 | 0.899 | 0.383 | 0.086 | 0.859 | |
| SRMR | **0.857** | 0.824 | 0.320 | 0.064 | 0.880 | 0.848 | 0.444 | 0.050 | 0.707 | 0.900 | 0.429 | 0.052 | 0.837 | |
| FEATURE LOSS - PASE FRONTEND WITH 4 TASKS | **0.847** | 0.856 | 0.344 | 0.122 | 0.780 | 0.865 | 0.445 | 0.074 | 0.691 | 0.820 | 0.352 | 0.130 | 0.675 | |
| AutoMOS | **0.810** | 0.833 | 0.331 | 0.215 | 0.574 | 0.794 | 0.326 | 0.183 | 0.570 | 0.803 | 0.364 | 0.159 | 0.560 | |
| Quality-Net | **0.807** | 0.731 | 0.345 | 0.089 | 0.594 | 0.853 | 0.424 | 0.096 | 0.665 | 0.836 | 0.393 | 0.110 | 0.666 | |
| WeNet | **0.767** | 0.757 | 0.279 | 0.134 | 0.688 | 0.787 | 0.370 | 0.083 | 0.668 | 0.757 | 0.289 | 0.158 | 0.619 | |
| CNN-ELM | **0.710** | 0.726 | 0.289 | 0.146 | 0.582 | 0.662 | 0.278 | 0.112 | 0.543 | 0.744 | 0.328 | 0.156 | 0.519 | |
| NISQA | **0.694** | 0.660 | 0.279 | 0.120 | 0.522 | 0.647 | 0.278 | 0.100 | 0.537 | 0.776 | 0.332 | 0.137 | 0.614 | |
| BEST OF SOTA | **0.694** | 0.660 | 0.279 | 0.050 | 0.522 | 0.647 | 0.278 | 0.050 | 0.537 | 0.744 | 0.289 | 0.052 | 0.519 | |
| | | 0.000 | | | | 0.000 | | | | 0.000 | | | | |
| OURS | **0.462** | 0.476 | 0.152 | 0.090 | 0.468 | 0.459 | 0.131 | 0.068 | 0.520 | 0.450 | 0.159 | 0.071 | 0.440 | -33% |

FIG. 8F

METHOD FOR LEARNING AN AUDIO QUALITY METRIC COMBINING LABELED AND UNLABELED DATA

CROSS-REFERENCE TO RELATED APPLICATIONS

This application is a National Phase entry of PCT Patent Application No. PCT/EP2021/066786, having international filing date of Jun. 21, 2021, which claims priority of the following priority applications: ES application P202030605, filed 22 Jun. 2020, U.S. provisional application 63/072,787, filed 31 Aug. 2020, U.S. provisional application 63/090,919, filed 13 Oct. 2020 and EP Application Serial No. 20203277.7, filed 22 Oct. 2020, which are hereby incorporated by reference.

TECHNICAL FIELD

The present disclosure generally relates to the field of audio processing. In particular, the present disclosure relates to techniques for speech/audio quality assessment using machine-learning models or systems, and to frameworks for training machine-learning models or systems for speech/audio quality assessment.

BACKGROUND

Speech or audio quality assessment is crucial for a myriad of research topics and real-world applications. Its need ranges from algorithm evaluation and development to basic analytics or informed decision making. Broadly speaking, audio quality assessment can be performed by subjective listening tests or by objective quality metrics. Objective metrics that correlate well with human judgment open the possibility to scale up automatic quality assessment, with consistent results at a negligible fraction of the effort, time, and cost of their subjective counterparts. Traditional objective metrics rely on standard signal processing blocks, like the short-time Fourier transform, or perceptually-motivated blocks, like the Gammatone filter bank. Together with further processing blocks, they create an often intricate and complex rule-based system. An alternative approach is to learn speech quality directly from raw data, by combining machine learning techniques with carefully chosen stimuli and their corresponding human ratings. Rule-based systems may have the advantage of being perceptually-motivated and, to some extent, interpretable, but often present a narrow focus on specific types of signals or degradations, such as telephony signals or voice-over-IP (VoIP) degradations. Learning-based systems, on the other hand, are usually easy to repurpose to other tasks and degradations, but require considerable amounts of human annotated data. Both rule- and learning-based systems might additionally suffer from lack of generalization, and thus perform poorly on out-of-sample but still on-focus data.

Thus, there is a need for methods and systems of performing (automatic) audio quality assessment and possibly also for methods of training such systems for (automatically) assessing audio quality that can achieve improved performance (e.g., in terms of error rate, consistency, etc.) and/or efficiency, while at the same time allowing for good generalization to new audios (e.g., recordings) and/or listeners.

SUMMARY

In view of the above, the present disclosure generally provides a method of training a neural-network-based system for determining an indication of an audio quality of an audio input, a neural-network-based system for determining an indication of an audio quality of an input audio sample and a method of operating a neural-network-based system for determining an indication of an audio quality of an input audio sample, as well as a corresponding program, computer-readable storage medium, and apparatus, having the features of the respective independent claims. The dependent claims relate to preferred embodiments.

According to an aspect of the disclosure, a method of training a deep-learning-based (e.g., neural-network-based) system for determining an indication of an audio quality of an audio input is provided. Training may mean determining parameters for the deep learning model(s) (e.g., neural networks(s)) that is/are used for implementing the system. Further, training may mean iterative training. The indication of the audio quality of the audio input may be a score, for example. The score may be normalized (limited) to a predetermined scale, such as between 1 and 5, if necessary. The method may comprise obtaining, as input(s), at least one training set comprising audio samples. In particular, the audio samples may comprise audio samples of a first type and audio samples of a second type. More particularly, each of the first type of audio samples may be labelled with information indicative of a respective predetermined audio quality metric (e.g., between 1 and 5), and each of the second type of audio samples may be labelled with information indicative of a respective audio quality metric relative to that of a reference audio sample (e.g., relative to that of another audio sample in the training set). In other words, the first type of audio samples may be seen as each comprising label information indicative of an absolute audio quality metric (e.g., normalized between 1 and 5, with 5 being of the highest audio quality). By contrast, the second type of audio samples may be seen as each comprising label information indicative of a relative audio quality metric. As can be understood and appreciated by the skilled person, the reference audio sample used here may be, but does not necessarily have to be, another audio sample in the training set. Put differently, the reference audio sample may be an external reference audio sample (i.e., not in the training set) or an internal reference audio sample (i.e., within the training set). Moreover, the reference audio sample may be any suitable audio sample, e.g., predefined or predetermined, that may be used to serve as a (comparative) reference, such that, in a broad sense, a relative metric can be determined (e.g., calculated) by comparing the audio sample with the reference audio sample. In some examples, the relative label information may comprise information indicative that an audio sample is more (or less) degraded than a (predetermined) reference audio sample (e.g., another audio sample in the training set). In some examples, the relative label information may comprise information indicative of a particular degradation function (and optionally, a corresponding degradation strength) that has been applied e.g. to a reference audio sample (e.g., another audio sample in the training set) when generating the (degraded) audio sample. Of course, any other suitable relative label information may be included if necessary or appropriate, as will be understood and appreciated by the skilled person. The method may further comprise inputting the training set to the deep-learning-based system, and iteratively training the system to predict the respective label information of the audio samples in the training set. The training may be based on a plurality of loss functions. Particularly, the plurality of loss functions may be generated to reflect differences between the label information of the audio samples in the training set and the respective predictions thereof.

Configured as described above, broadly speaking, the proposed method may train a neural network that produces non-intrusive quality ratings. Because the ratings are learnt from data, the focus can be repurposed by changing the audio type with which is trained, and the degradations that are of interest to learn from can also be chosen. Notably, the proposed method is generally semi-supervised, meaning that it can leverage both absolute and relative ratings obtained from different data sources. This way, it can alleviate the need for expensive and time-consuming listener data. In addition to learning from multiple sources, the proposed method also, by training the network based on a plurality of loss functions (generated in accordance with the audio samples in the data sources), learns from multiple characterizations of those sources, therefore inducing a much more general automatic measurement.

In some examples, the first type of audio samples may comprise human annotated audio samples. Each of the human annotated audio samples may be labelled with the information indicative of the respective predetermined audio quality metric. As can be understood and appreciated by the skilled person, the audio samples may be annotated in any suitable means, for example by audio experts, regular listeners, mechanical turkers (e.g., crowdsourcing), etc.

In some examples, the human annotated audio samples may comprise mean opinion score (MOS) audio samples and/or just-noticeable difference (JND) audio samples. Some possible examples for the MOS data sets and the JND data sets are given in sections B.1 and B.2 respectively of the enclosed appendix.

In some examples, the second type of audio samples may comprise algorithmically (or programmatically, artificially) generated audio samples each being labelled with the information indicative of the relative audio quality metric.

In some examples, each of the algorithmically generated samples may be generated by selectively applying at least one degradation function each with a respective degradation strength to a reference audio sample or to another algorithmically generated audio sample. In such examples, the label information may comprise information indicating the respective degradation function and/or the respective degradation strength that have been applied thereto. Of course, any other suitable algorithm and/or program may be used for generating the second type of audio samples, as will be appreciated by the skilled person.

In some examples, the label information may further comprise information indicative of degradation relative to one another. That is to say, in some examples, the label information may further comprise information indicative of degradation relative to the reference audio sample or to other audio samples in the training set. For instance, the label information may comprise relative information indicating that one audio sample is relatively more or less degraded than another audio sample (e.g., an external reference audio sample or another audio sample in the training set).

In some examples, the degradation function may be selected from a plurality of available degradation functions. The plurality of available degradation functions may be implemented as a degradation function pool, for example. Additionally or alliteratively, the respective degradation strength may be set such that, at its minimum, the degradation may still be perceptually noticeable (e.g., by an expert, a listener, or the author).

In some examples, the plurality of available degradation functions may comprise functions relating to one or more functions, operations or processes of: reverberation, clipping, encoding with different codecs, phase distortion, audio reversing, and background noise. Further, the (background) noise may comprise real (e.g., recorded) background noise or artificially-generated background noise. Note that, in some cases, the degradation strengths chosen may be only one aspect of the whole degradation and that, for other relevant aspects, it may be randomly sampled between empirically chosen values. For instance, for the case of the reverb effect, the signal-to-noise ratio (SNR) may be selected as the main strength, but a type of reverb, a width, a delay, etc. may also be randomly chosen. Some possible examples for the degradations and/or strengths are given in section C of the enclosed appendix.

In some examples, the algorithmically generated audio samples may be generated as pairs of audio frames $\{x_i, x_j\}$ and/or quadruples of audio frames $\{x_{i_k}, x_{i_l}, x_{j_k}, x_{j_l}\}$. In particular, the audio frame $x_i$ may be generated by selectively applying at least one degradation function each with a respective degradation strength to a (e.g., external) reference audio frame (or an audio frame from the training set). Then, the audio frame $x_j$ may be generated by selectively applying at least one degradation function each with a respective degradation strength to the audio frame $x_i$. Further, the audio frames $x_{i_k}$ and $x_{i_l}$ may be extracted from audio frame $x_i$ by selectively applying a respective time delay to the audio frame $x_i$, and the audio frames $x_{j_k}$ and $x_{j_l}$ may be extracted from audio frame $x_j$ by selectively applying a respective time delay to the audio frame $x_j$. By way of example but not as limitation, the audio frame $x_i$ may be of 1.1 seconds in length, and the audio frames $x_{i_k}$ and $x_{i_l}$ that are extracted from the 1.1 seconds audio frame $x_i$ may be of 1 second in length. As can be understood and appreciated by the skilled person, the audio samples may be generated in any suitable means, depending on various implementations and/or requirements.

In some examples, the loss functions may comprise a first loss function indicative of a MOS error metric. The first loss function may be calculated based on a difference between a MOS ground truth of an audio sample in the training set and a prediction of the audio sample. In this sense, the first loss function may in some cases also be considered as indicating a MOS opinion score metric. Of course, besides differences, any other suitable means, such as suitable mathematical concepts like divergences or cross-entropies, may be used for determining (calculating) the first loss function (or any other suitable loss functions that will be discussed in detail below), as will be understood and appreciated by the skilled person.

In some examples, the label information of the second type of audio samples may comprise relative (label) information indicative of whether one audio sample is more (or, in some cases, less) degraded than another audio sample. The further loss functions may comprise, in addition to or instead of the first loss function illustrated above, a second loss function indicative of a pairwise ranking metric. Particularly, the second loss function may be calculated based on the ranking established by the label information comprising the relative degradation information and the prediction thereof.

In some examples, the system may be trained in such a manner that one less degraded audio sample gets an audio quality metric indicative of a better audio quality than another more degraded audio sample.

In some examples, the label information of the second type of audio samples may comprise relative information indicative of perceptual relevance between audio samples.

The perceptual relevance may be indicative of the perceptual difference or the perceptual similarity between two audio samples or between two pairs of audio samples, for example. That is, broadly speaking, if two audio signals are extracted from the same (audio) source and differ by just a few audio samples, or if the difference between two signals is perceptually irrelevant, then their respective quality metrics (or quality scores) should be essentially the same. Complementarily, if two signals are perceptually distinguishable, then their metric/score difference should be above a certain margin. Notably, these two notions may also be extended to pairs of pairs, e.g., by considering the consistency between pairs of score differences. Accordingly, the loss functions may, additionally or alternatively, comprise a third loss function indicative of a consistency metric, and particularly, the third loss function may be calculated based on the difference between the label information comprising the perceptual relevance information and the prediction thereof. In this sense, the third loss function may in some cases also be considered as indicating a score consistency metric.

In some examples, the consistency metric may indicate whether two or more audio samples have the same degradation function and/or degradation strength, and correspond to the same time frame.

In some examples, the label information of the second type of audio samples may comprise relative information indicative of whether one audio sample has been applied with the same degradation function and the same degradation strength as another audio sample. Accordingly, the loss functions may, additionally or alternatively, comprise a fourth loss function indicative of a (same or different) degradation condition metric. Particularly, the fourth loss function may be calculated based on the difference between the label information comprising the relative degradation information/condition and the prediction thereof.

In some examples, the label information of the second type of audio samples may comprise relative information indicative of perceptual difference relative to one another. Accordingly, the loss functions may, additionally or alternatively, comprise a fifth loss function indicative of a JND metric, and the fifth loss function may be calculated based on the difference between the label information comprising the relative perceptual difference and the prediction thereof.

In some examples, the label information of the second type of audio samples may comprise information indicative of the degradation function that has been applied to an audio sample. Accordingly, the loss functions may, additionally or alternatively, comprise a sixth loss function indicative of a degradation type metric. Particularly, the sixth loss function may be calculated based on difference between the label information comprising the respective degradation function type information and the prediction thereof.

In some examples, the label information of the second type of audio samples may comprise information indicative of the degradation strength that has been applied to an audio sample. Accordingly, the loss functions may, additionally or alternatively, comprise a seventh loss function indicative of a degradation strength metric. And the seventh loss function may be calculated based on difference between the label information comprising the respective degradation strength information and the prediction thereof.

In some examples, the loss functions may, additionally or alternatively, also comprise an eighth loss function indicative of a regression metric. Particularly, the regression metric may be calculated according to at least one of reference-based and/or reference-free quality measures.

In some examples, the reference-based quality measures may comprise, but not be limited to, at least one of: perceptual evaluation of speech quality (PESQ), composite measure for signal (CSIG), composite measure for noise (CBAK), composite measure for overall quality (COVL), segmental signal-to-noise ratio (SSNR), log-likelihood ratio (LLR), weighted slope spectral distance (WSSD), short-term objective intelligibility (STOI), scale-invariant signal distortion ratio (SISDR), Mel cepstral distortion, and log-Mel-band distortion. Of course, any other suitable reference-based and/or reference-free quality measures may be used, as will be appreciated by the skilled person.

In some examples, each of the audio samples in the training set may be used in at least one of the plurality of loss functions. That is to say, some of the audio samples in the training set may be reused or shared by one or more of the loss functions. For instance, (algorithmically generated) audio samples for calculating the third loss function (i.e., the score consistency metric) may be reused when calculating the fourth loss function (i.e., the same/different degradation condition metric), or vice versa. As such, efficiency in training the system may be significantly improved. Particularly, a final loss function for the training may be generated based on an averaging process of one or more of the plurality of loss functions. As will be appreciated by the skilled person, any other suitable means or process may be used to generate the final loss function based on any number of suitable loss functions, depending on various implementations and/or requirements.

In some examples, the system may comprise an encoding stage (or simply referred to as an encoder) for mapping (e.g., transforming) the audio input into a feature space representation. The feature space representation may be (feature) latent space, for example. The system may then further comprise an assessment stage for generating the predictions of label information based on the feature space representation.

In some examples, the encoding stage for generating the intermediate representation may comprise a neural network encoder.

In some examples, each of the plurality of loss functions may be determined based on a neural network comprising a linear layer or a multilayer perceptron, MLP.

According to another aspect of the disclosure, a deep-learning-based (e.g., neural-network-based) system for determining an indication of an audio quality of an input audio sample is provided. The system may be trained in accordance with any one of the examples as illustrated above. In particular, the system may comprise an encoding stage and an assessment stage. More particularly, the encoding stage may be configured to map the input audio sample into a feature space representation. Further, the assessment stage may be configured to, based on the feature space representation, predict information indicative of a predetermined audio quality metric and further predict information indicative of a relative audio quality metric relative to a reference audio sample. As can be understood and appreciated by the skilled person, the reference audio sample used here may be, but does not necessarily have to be, another audio sample in the training set for training the system. Put differently, the reference audio sample may be an external reference audio sample (i.e., not in the training set) or an internal reference audio sample (i.e., within the training set). Moreover, the reference audio sample may be any suitable audio sample, e.g., predefined or predetermined, that may be used to serve as a (comparative) reference, such that, in a broad sense, a relative metric can be determined (e.g., calculated) by comparing the audio sample with the reference audio sample. Furthermore, the predicted information (e.g., that indicative of a relative audio quality metric relative to a reference audio sample) may be used for further training (regularizing) the system.

In some examples, the system may be configured to take, as input, at least one training set. In particular, the training set may comprise audio samples of a first type and audio samples of a second type, wherein each of the first type of audio samples is labelled with information indicative of a respective predetermined audio quality metric, and wherein each of the second type of audio samples is labelled with information indicative of a respective audio quality metric relative to that of a reference audio sample or relative to that of another audio sample in the training set. Further, it may be configured to input the training set to the system; and iteratively train the system, based on the training set, to predict the respective label information of the audio samples in the training set based on a plurality of loss functions that are generated to reflect differences between the label information of the audio samples in the training set and the respective predictions thereof.

According to yet another aspect of the disclosure, a method of operating a deep-learning-based (e.g., neural-network-based) system for determining an indication of an audio quality of an input audio sample is provided. The system may correspond to any one of the example systems as illustrated above; and the system may be trained in accordance with any one of the example methods as illustrated above. For example, the system may comprise an encoding stage and an assessment stage. Particularly, the method may comprise mapping, by the encoding stage, the input audio sample into a feature space representation. The method may further comprise predicting, by the assessment stage, information indicative of a predetermined audio quality metric and information indicative of a relative audio quality metric relative to a reference audio sample, based on the feature space representation. As can be understood and appreciated by the skilled person, the reference audio sample used here may be, but does not necessarily have to be, another audio sample in the training set. Put differently, the reference audio sample may be an external reference audio sample (i.e., not in the training set) or an internal reference audio sample (i.e., within the training set). Moreover, the reference audio sample may be any suitable audio sample, e.g., predefined or predetermined, that may be used to serve as a (comparative) reference, such that, in a broad sense, a relative metric can be determined (e.g., calculated) by comparing the audio sample with the reference audio sample. Furthermore, the predicted information (e.g., that indicative of a relative audio quality metric relative to a reference audio sample) may be used for further training (regularizing) the system.

According to a further aspect of the disclosure a computer program is provided. The computer program may include instructions that, when executed by a processor, cause the processor to carry out all steps of the example methods described throughout the disclosure.

According to a further aspect, a computer-readable storage medium is provided. The computer-readable storage medium may store the aforementioned computer program.

According to yet a further aspect, an apparatus including a processor and a memory coupled to the processor is provided. The processor may be adapted to cause the apparatus to carry out all steps of the example methods described throughout the disclosure.

It will be appreciated that system features and method steps may be interchanged in many ways. In particular, the details of the disclosed method(s) can be realized by the corresponding system, and vice versa, as the skilled person will appreciate. Moreover, any of the above statements made with respect to the method(s) are understood to likewise apply to the corresponding system, and vice versa.

BRIEF DESCRIPTION OF DRAWINGS

Example embodiments of the disclosure are explained below with reference to the accompanying drawings, wherein FIGS. 4-8 are example illustrations showing various results and comparisons based on the embodiment of the disclosure.

DETAILED DESCRIPTION

Figure 1A:
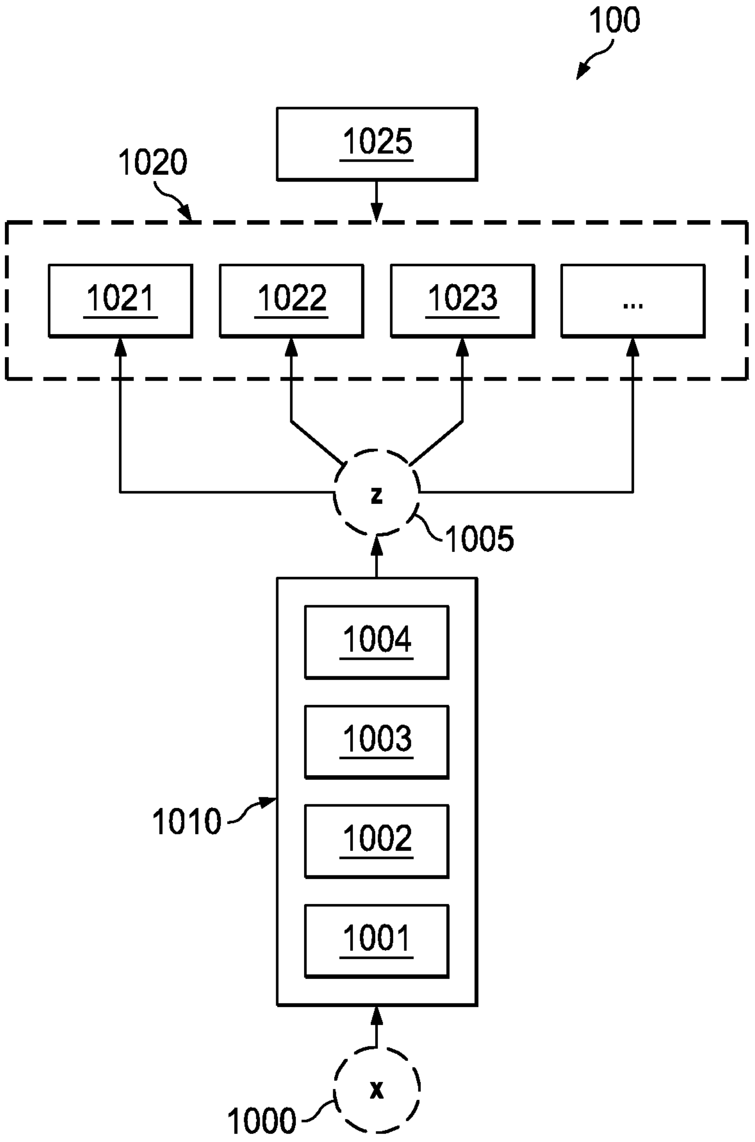
FIG. 1A is a schematic illustration of a block diagram of a system for audio quality assessment according to an embodiment of the present disclosure.

The Figures (Figs.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Generally speaking, quality ratings are essential in the audio industry, with uses that range from monitoring channel distortions to developing new processing algorithms. Traditionally, quality ratings have been obtained from regular or expert listeners, with considerable investment with regard to money, time, and infrastructure. In this present disclosure, an automatic tool to provide such quality ratings is proposed.

The purpose of an automatic tool (or algorithm) to measure audio quality is to obtain a reliable proxy of human ratings that overcomes the aforementioned investment. There are several automatic tools to measure speech quality of an audio file. Given some input audio, such tools yield a score, typically between 1 and 5, that correlates to some subjective rating of audio quality.

One distinction between those tools is whether they use a reference (clean) audio for comparison or not (intrusive vs.

non-intrusive). Another distinction is whether they are hand-crafted/predefined or learned from data. A further consideration is the scope of the audio that is going to be analyzed, and the specific degradations or distortions that the measure is going to be able to detect.

Thus, a key driver of the present disclosure is to notice that additional evaluation criteria/tasks should be considered beyond correlation with convention or rational measures, such as mean opinion scores (MOS), of speech quality. Particularly, it is decided to also learn from such additional evaluation criteria. Another fundamental aspect of the present disclosure is to realize that there are further objectives, data sets, and tasks that can complement those criteria and help to learn a more robust representation of speech quality and scores.

In view thereof, broadly speaking, the present disclosure proposes a method to train a neural network that produces non-intrusive quality ratings. Because the ratings are learnt from data, the focus can be repurposed by changing the audio type with which the neural network is trained, and the degradations that are of interest to learn from can also be chosen. Notably, the proposed method is generally semi-supervised, meaning that it may leverage both ratings obtained from human listeners (e.g., embedded in human annotated data, sometimes also referred to as labeled data) and raw (non-rated) audio as input data (sometimes also referred to as unlabeled data). This way, it can alleviate the need for expensive and time-consuming listener data. In addition to learning from multiple sources, the proposed method also learns from multiple characterizations of those sources, therefore inducing a much more general automatic measurement. Additional design principles of the proposed method (and system) may include, but may not be limited to, lightweight and fast operation, fully-differentiable in nature, and the ability to deal with short-time raw audio frames e.g. at 48 kHz (thus yielding a time-varying, dynamic estimate).

Referring to FIG. 1A, a schematic illustration of a (simplified) block diagram of a system 100 for audio quality assessment according to an embodiment of the present disclosure is shown. The system 100 may be composed of an encoding stage (or simply referred to as an encoder) 1010 and an assessment stage 1020. As shown in the example of FIG. 1A, the assessment stage 1020 may comprise a series of "heads" 1021, 1022 and 1023, sometimes (collectively) denoted as H. The different heads will be described in detail below with reference to FIG. 1B. Broadly speaking, each of the heads may be considered as an individual calculation unit suitable for determination of respective label information (e.g., absolute quality metric, or relative quality metric) that is associated with a respective audio sample (frame). In general, the encoder 1010 may take raw input audio signals (e.g., audio frames)×1000 and map (or transform) them to e.g. latent space representation (vectors) z 1005. The different heads may then take these latent vectors z 1005 and compute the outputs for one or more considered criteria (which are exemplarily shown as 1025). Notably, in some cases, when dealing with pairs $\{z_i, z_j\}$, the heads may take their concatenation (or any other suitable form) as input.

The encoder 1010 may, in some examples, consist of four main stages, as shown in FIG. 1A. First of all, the encoder 1010 may transform the distribution of x 1000 by applying a μ-law formula (e.g., without quantization) with a learnable μ. Generally speaking, the μ-law algorithm (sometimes written as "mu-law") is a companding algorithm, primarily used for example in 8-bit PCM digital telecommunication systems. Notably, companding algorithms may be used to reduce the dynamic range of an audio signal. In analog systems, this can increase the SNR achieved during transmission; while in the digital domain, it can reduce the quantization error (hence increasing signal to quantization noise ratio). For example, the value of μ may be initialized to 8 at the beginning. Next, block 1001 maybe employed which may, in some examples, comprise a series of (e.g., 4) pooling sub-blocks, consisting of convolution, batch normalization (BN), rectified linear unit (ReLU) activation, BlurPool, or any other suitable blocks/modules. As an example but not as limitation, 32, 64, 128, and 256 filters with a kernel width of 4 and a downsampling factor of 4 may be used. Of course, any other suitable implementations may as well be employed, as will be appreciated by the skilled person. For example, possible alternatives to convolution include, but are not limited to linear layers, recurrent neural networks, attention modules, or transformers. Possible alternatives to batch normalization include, but are not limited to layer normalization, instance normalization, or group normalization. In some other implementations, batch normalization may be altogether omitted. Possible alternatives to ReLUs include, but are not limited to sigmoid gates, tanh gates, gated linear units, parametric ReLUs, or leaky ReLUs. Possible alternatives to BlurPool include, but are not limited to convolutions with stride, max pooling, or average pooling. It is further understood that the aforementioned alternative implementations may be combined with each other as required or feasible, as the skilled person will appreciate.

Next, block 1002 may be employed which may, in some examples, comprise a number of (e.g., 6) residual blocks formed by a BN preactivation, followed by 3 blocks of ReLU, convolution, and BN. As an example but not as limitation, 512, 512, and 256 filters with kernel widths 1, 3, and 1 may be used, and the residual connection by parametric linear averaging: $h'=a'h+(1-a')F(h)$, where $a'=\sigma(a)$ is a vector of learnable parameters between 0 and 1, and F is the residual network (e.g., all components of a may be initialized to 3 so that training starts with mostly a bypass from h to h'). After the residual blocks 1002, time-wise statistics may be computed in block 1003, for example taking the per-channel mean and standard deviation. This step may aggregate all temporal information into a single vector (e.g., of 2×256 dimensions). Subsequently, in block 1004 BN may be performed on such vector and then be input to a multi-layer perceptron (MLP) formed by e.g. two linear layers with BN, using a ReLU activation in the middle. As an example but not as limitation, 1024 and 200 units may be employed.

Figure 1B:
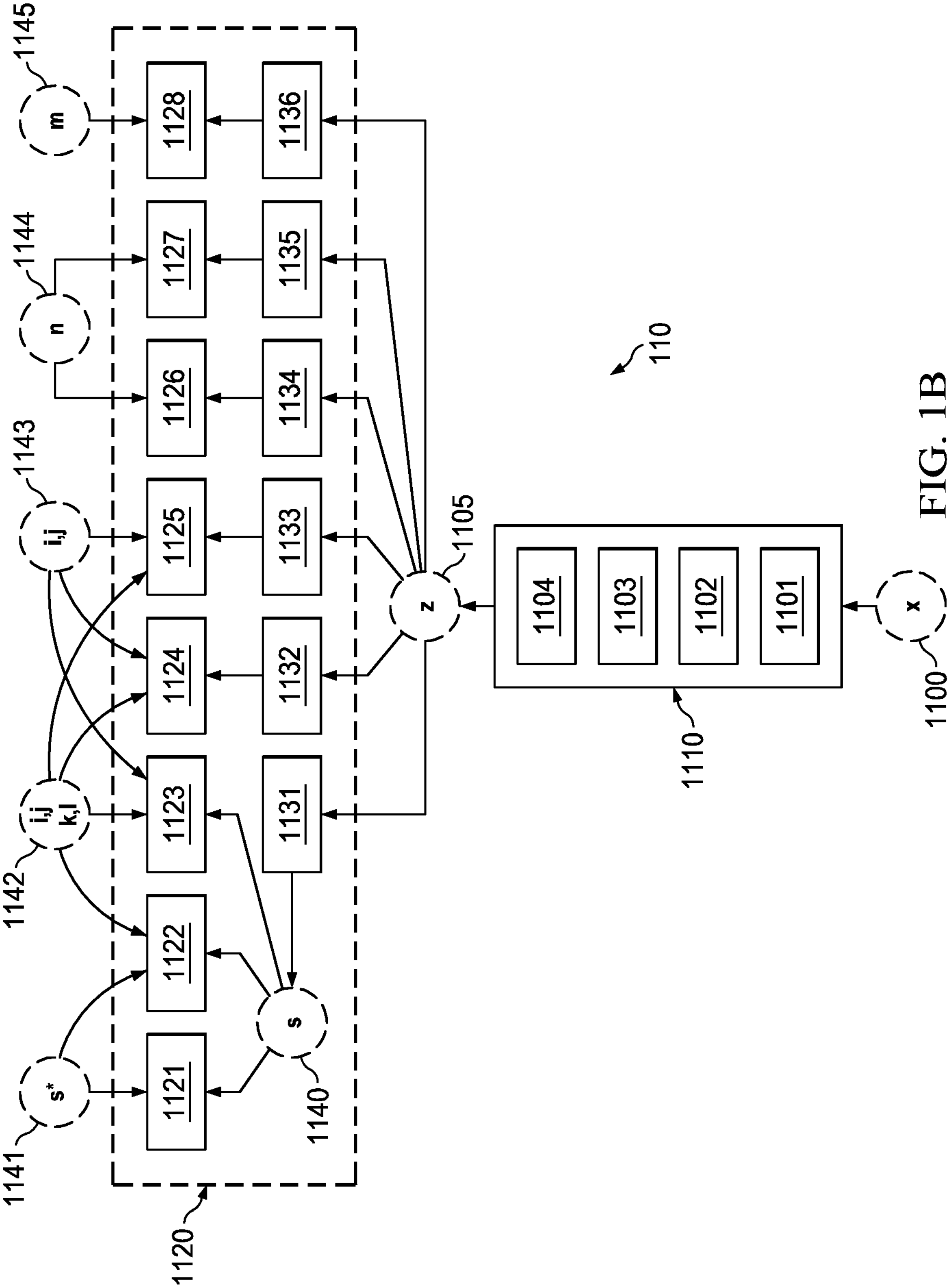
FIG. 1B is a schematic illustration of another block diagram of a system for audio quality assessment according to an embodiment of the present disclosure.

Now referring to FIG. 1B, where a schematic illustration of a more detailed block diagram of a system 110 for audio quality assessment according to an embodiment of the present disclosure is shown. Notably, identical or like reference numbers in the system 110 of FIG. 1B indicate identical or like elements in the system 100 as shown in FIG. 1A, such that repeated description thereof may be omitted for reasons of conciseness. Particularly, in the example system 110 of FIG. 1B, focuses will be put on the assessment stage 1120, where the different learning/training criteria of the heads will be discussed in detail below.

With reference to the system 110 of FIG. 1B, broadly speaking, a (convolutional) neural network may be trained that may transform audio input x 1100 to a (low-dimensional) latent space representation z 1105 and later may output a single-valued score s 1140. Similarly to that as shown in FIG. 1A, the network/system may be formed of two main blocks (stages), namely the encoding stage (or sometimes referred to as the encoder network) 1110, which outputs latent vectors z 1105, and an assessment stage 1120 comprising a number of different "heads", which further process the latent vectors z 1105. Notably, one of the heads is in charge of producing the final score s 1140 and the rest of the heads are generally useful to regularize the latent space (they can also be used as predictors for the quantities they are trained with).

Similar to that of FIG. 1A, the encoding stage 1110 may take a μ-law logarithmic representation of the audio and pass it through a series of convolutional blocks. For instance, firstly, a number of BlurPool blocks (e.g., 1101) may decimate the signal to a lower time-span. Next, a number of ResNet blocks (e.g., 1102) may further process the obtained representation. Then, time-wise statistics (e.g., 1103) such as mean, standard deviation, minimum, and maximum may be taken to summarize an audio frame. Finally, a MLP (e.g., 1104) may be used to perform a mapping between those statistics and the z values 1105.

The different heads may take the z vectors 1105 and predict different quantities 1121-1128. Generally speaking, at training time, every head may have a loss function imprinting desirable characteristics to either the score s 1140 or the latent space z 1105.

Notably, the scores s may be computed in any suitable manner, as will be appreciated by the skilled person. Some possible examples regarding how the scores s may be computed are provided for example in section A of the enclosed appendix.

Now with reference to the system 110 of FIG. 1B, examples of various possible learning or evaluation criteria corresponding to possible heads and their respective loss functions will be discussed in detail below. Some of these criteria may, in some cases, be considered as auxiliary tasks. In other words, not all of the criteria are necessarily to be used when performing the training of the systems and some of the criteria may be omitted or bypassed, depending on various implementations and/or requirements. Of course, as will be understood and appreciated by the skilled person, criteria (or heads) are not restricted to the ones discussed herein, but could be expanded or adapted to any specific case.

Mean Opinion Score

The principal and almost unique criterion considered by conventional approaches may be the MOS error. In some cases, this may also be referred to simply as the score head 1121. Generally speaking, this score head may take z 1105 as input and pass it through, for example, a linear layer (could be also an MLP or any other suitable neural network) 1131 to produce a single quality score value s. As an example, such score may be bounded with a sigmoid function and rescaled to be for instance between 1 and 5 (e.g., with 5 being of the highest quality). And to compute the loss for this head, ratings provided by human listeners, if available, may be used, for example. An alternative may be to use ratings provided by other existing quality measures, either reference-based or reference-free. Put differently, broadly speaking, it may be considered that the loss functions may comprise a first loss function indicative of a MOS error metric, and that the first loss function may be calculated based on a difference between a MOS ground truth of an audio sample in the training set and a prediction of the audio sample.

To be more specific (but not as limitation), in learning-based approaches, a supervised regression problem is usually set, such that $$L^{MOS}=\|s_i^*-s_i\| \quad (1)$$

where $s_i^*$ 1141 is the MOS ground truth, $s_i$ is the score predicted by the model, and $\|\ \|$ corresponds to some norm. For instance, the L1 norm (mean absolute error) or any other suitable norm may be used.

In one example, the system 110 may predict scores $s_i$ from a latent representation $z_i$ by using, for example, a linear unit and a sigmoid activation σ: $s_i=1+4\sigma(w^T z_i+b)$, where example coefficients 1 and 4 adapt the score to MOS values between 1 and 5. The latent representation $z_i$ may be obtained by encoding a raw audio frame $x_i$ through a neural network encoder 1110.

Pairwise Ranking

Besides MOS, another intuitive but often overlooked notion in quality assessment may be pairwise rankings. In some cases, this may also be referred to simply as the rank head 1122. Generally speaking, this pairwise ranking head 1122 may take pairs of scores e.g. $s_1$ and $s_2$ as input, which may be obtained from the previous score head after processing audios $x_1$ and $x_2$. It may then compute a rank-based loss using a flag (such as label information) signaling which audio is more (or less) degraded, if available. For example, the loss may encourage $s_i$ being lower than $s_2$, if $x_1$ is more degraded/distorted than $x_2$ (or the other way around). In other words, broadly speaking, it may be considered that the loss functions may comprise a second loss function indicative of a pairwise ranking metric, and that the second loss function may be calculated based on the difference between the label information (e.g., ranking established by the label information) comprising the relative degradation information and the prediction thereof.

To be more specific (but not as limitation), under the notion of pairwise ranking, if a speech signal $x_j$ is a programmatically (algorithmically) degraded version of the same (originally 'clean', or 'cleaner') utterance $x_i$, then their scores should reflect such relation, that is, $s_i \geq s_j$. This notion may then be introduced in a training schema by considering learning-to-rank strategies. In one example, it may follow a margin loss formulation $$L^{RANK}=\max(0,s_j-s_i+\alpha) \quad (2)$$

where α=0.3 (or any other suitable value) may be used as the margin constant.

In one example, pairs $\{x_i, x_j\}$ 1142 may be programmatically generated by considering a number of data sets with 'clean' speech (or also referred to as reference speech) and a pool of several degradation functions.

The pairs of $\{x_i, x_j\}$ 1142 may be generated in any suitable means. As an example but not as limitation, for forming every pair, it may be proceeded as follows:

- Uniformly sample a data set and uniformly sample a file from it.
- Uniformly sample a 1.1 s (or any other suitable length) frame, avoiding silent or majorly silent frames. Normalize it to have a maximum absolute amplitude of 1.
- With probabilities 0.84, 0.12, and 0.04 sample zero, one, or two degradations from a pool of available degradations (which will be discussed in detail later). If zero degradations, the signal directly becomes $x_i$. Otherwise, a strength for each degradation may be uniformly chosen and applied sequentially to generate $x_i$.
- With probabilities 0.75, 0.2, 0.04, and 0.01 sample one, two, three, or four degradations from the pool of available degradations. Uniformly select strengths and apply them to $x_i$ sequentially to generate $x_j$.

It should be understood that the above implementation, including the mentioned probabilities, merely serves the purpose of illustration without any limitation. Any other suitable probabilities or implementation may be applied thereto, as will be appreciated by the skilled person.

The generated pairs $\{x_i, x_j\}$ may then be stored with the information of degradation type and/or strength (for example stored as label information).

Additional information about possible means for generating the pairs may also be found for example in section B.3 of the enclosed appendix.

Additionally or alternatively, random pairs may also be gathered for example from (human) annotated data, assigning indices i and j depending on for example the corresponding s*, such that the element of the pair with a larger s* may get index i, or vice versa. For pairs coming from annotated data, the margin constant may for example be set as $\alpha'=\min(\alpha, s_i^*-s_j^*)$ or any other suitable value.

Score Consistency

Consistency may also be another overlooked notion in audio quality assessment. Generally speaking, the consistency head 1123 may take pairs of scores $s_1$ and $s_2$ as input, corresponding to audios $x_1$ and $x_2$, respectively. It may then compute a distance-based loss using a flag (e.g., label information) signaling whether audios may have the same degradation type and/or level, if available. For example, the loss may encourage $s_1$ being closer to $s_2$, if $x_1$ has the same distortion/degradation as $x_2$ and at the same level (in some cases, similar original content being present in both $x_1$ and $x_2$ may be assumed, if necessary). It may also encourage that similar realizations of $x_1$ and $x_2$ with different degradations $x'_1$ and $x'_2$ may also be close together (e.g., $x_1$ with $x'_1$ and $x_2$ with $x'_2$). In other words, broadly speaking, it may be considered that the loss functions may comprise a third loss function indicative of a consistency metric, and that the third loss function may be calculated based on the difference between the label information comprising the perceptual relevance information and the prediction thereof.

To be more specific (but not as limitation), under the notion of score consistency, if two signals $x_k$ and $x_l$ are extracted from (essentially) the same source and differ by just a few audio samples, or if the difference between two signals $x_k$ and $x_l$ is perceptually irrelevant, then their scores should be essentially the same, that is, $s_k=s_l$. Complementarily, if two signals $x_i$ and $x_j$ are perceptually distinguishable, then their score difference should be above a certain (e.g., predetermined) margin, that is, $|s_i-s_j|\geq\beta$. Notice that these two notions may also be further extended e.g. to pairs of pairs, by considering the consistency between pairs of score differences. In one possible implementation, the first notion may be extended as: if there are two signals $x_{ik}$ and $x_{jk}$ that are respectively perceptually the same as $x_{il}$ and $x_{jl}$ (with $x_j$ having more degradation than $x_i$, signals k and l extracted from those), score differences should tend to be equal, that is, $s_{ik}-s_{jk}=s_{il}-s_{jl}$.

In one example, if taking all above three notions into account, the consistency loss may be proposed as $$L^{CONS}=\frac{1}{4}(|s_k-s_l|+|s_{ik}-s_{jk}-(s_{il}-s_{jl})|)+\frac{1}{2\beta}(1-\min(|s_i-s_j|,\beta)) \quad (3)$$

where $\beta=0.1$ (or any other suitable value) is another margin constant.

Notably, the pairs of audio frames/signals $\{x_i, x_j\}$ 1142 may be generated as illustrated above during the calculation of pairwise ranking or in any other suitable means. Further, quadruples of audio frames $\{x_{ik}, x_{il}, x_{jk}, x_{jl}\}$ 1142 may be generated for example by extracting them from pairs $x_i$ and $x_j$ using a random small delay (such as below 100 ms). As an example but not as a limitation, for forming each quadruple from a given pair $\{x_i, x_j\}$, it may be proceeded as follows:

Uniformly sample a time delay between 0 and 100 ms. Extract 1 s frames $x_{ik}$ and $x_{il}$ from $x_i$ using such delay, and do the same for $x_{jk}$ and $x_{jl}$ from $x_j$.

Same as above, the generated quadruples $\{x_{ik}, x_{il}, x_{jk}, x_{jl}\}$ may be stored with the information of degradation type and/or strength (for example stored as label information).

Additional information about possible means for generating the quadruples may also be found for example in section B.3 of the enclosed appendix.

Additionally or alternatively, pairs $\{x_i, x_j\}$ and/or $\{x_k, x_l\}$ may also be taken from a (predetermined) JND data set 1143, and the quadruples $\{x_{ik}, x_{il}, x_{jk}, x_{jl}\}$ may then be generated from those pairs $\{x_i, x_j\}$ and/or $\{x_k, x_l\}$.

Same/Different Condition

With the data that are programmatically generated for $L^{CONS}$ as illustrated above, it may also provide information on pairs of signals that correspond to (essentially) the same degradation condition, that is, signals that have undergone the same degradation type and (optionally) also the same strength. In other words, broadly speaking, it may be considered that the loss functions may comprise a fourth loss function indicative of a degradation condition metric, and that the fourth loss function may be calculated based on the difference between the label information comprising the relative degradation information and the prediction thereof.

In one possible example, this information may then be included by considering the classification loss in the head 1124

$$L^{SD}=\mathrm{BCE}(\delta^{SD}, H^{SD}(z_u, z_v)) \quad (4)$$

where BCE stands for binary cross-entropy, $\delta^{SD}\in\{0,1\}$ indicates if latent vectors $z_u$ and $z_v$ correspond to the same condition ($\{u,v\}\triangleq\{k,l\}$) or not ($\{u,v\}\triangleq\{j,j\}$), and H may for example be a small neural network 1132 that could take the concatenation of the two vectors and produces a single probability value.

Just-Noticeable Difference

If, as mentioned above, pairs of signals with human annotations regarding their perceptual difference (or relevance) may be accessible or available from the training set, this notion of perceptual difference (or relevance) may be further reinforced in the latent space for example with another classification loss in the head 1125

$$L^{JND}=\mathrm{BCE}(\delta^{JND}, H^{JND}(z_u, z_v)) \quad (5)$$

where $\delta^{JND}\in\{0,1\}$ indicates if the latent representations $z_u$ and $z_v$ correspond to a JND or not. BCE (binary cross-entropy) and H (a small neural network 1133) may be the same as or similar to those illustrated above or in any other suitable form.

In other words, broadly speaking, it may be considered that the loss functions may comprise a fifth loss function indicative of a JND metric, and that the fifth loss function may be calculated based on the difference between the label information comprising the relative perceptual difference and the prediction thereof.

Degradation Type

Another advantage of programmatically generated data is that, if one starts from signals that are considered clean or without noticeable degradations, it may be known which degradations have been applied. Accordingly, generally speaking, this degradation type head (sometimes also referred to as the classification head) 1126 may take latent vectors z and further process them (e.g., through an MLP 1134) to produce a probability output. It may then further compute a binary cross-entropy using flags (e.g., label information) signaling the type of distortion in the original audio, if available. In other words, broadly speaking, it may be considered that the loss functions may comprise a sixth loss function indicative of a degradation type metric, and that the sixth loss function may be calculated based on difference between the label information comprising the respective degradation function information and the prediction thereof.

More specifically, in one possible implementation, a multi-class classification loss may be built as $$L^{DT} = \sum_n BCE\left(\delta_n^{DT}, H_n^{DT}(z_i)\right) \tag{6}$$

where $\delta_n^{DT} \in \{0,1\}$ indicates if the latent representations $z_i$ contains degradation n or not.

BCE (binary cross-entropy) and H (a neural network 1134) may be the same as or similar to those illustrated above or in any other suitable form. In some examples, the case where there is no degradation may also be included as one of the n possibilities, therefore being seen as constituting on its own a binary clean/degraded classifier.

Degradation Strength

Generally speaking, this degradation strength head 1127 (sometimes also referred to as the degradation head to be distinguishable from the classification head 1126 illustrated above) may take latent vectors z and further process them (e.g., through an MLP 1135) to produce an output, e.g., a value between 1 and 5. It may then compute a regression-based loss with the level of degradation that has been introduced to the audio, if available (e.g., from the available label information). In some implementations, this level of degradation may be logged (stored) from an (automatic) degradation algorithm that has been applied prior to training the network/system. In other words, broadly speaking, it may be considered that the loss functions may comprise a seventh loss function indicative of a degradation strength metric, and that the seventh loss function may be calculated based on difference between the label information comprising the respective degradation strength information and the prediction thereof.

To be more specific (but not as limitation), at the moment of applying a degradation to a signal, a corresponding degradation strength may usually also be decided (and applied thereto). Therefore, in a possible example, the corresponding regressors may be added as $$L^{DS} = \sum_n \left\| \varsigma_n^{DS} - H_n^{DS}(z_i) \right\| \tag{7}$$

where $$\varsigma_n^{DS} \in [0, 1]$$

indicates the strength of degradation n.

Other Quality Assessment Measures

Finally, since pairs $\{x_i, x_j\}$ have been generated, it may always be possible to also compute other or conventional reference-based (or reference-free) quality measures over those pairs and learn from them.

Generally speaking, this regression head 1128 may takes latent vectors z and further processes them (e.g., through an MLP 1136) to produce as many outputs as alternative metrics that are available or have been pre-computed for the considered audios, if available.

In other words, broadly speaking, it may be considered that the loss functions may comprise an eighth loss function indicative of a regression metric, and that the regression metric may be calculated according to at least one of reference-based and/or reference-free quality measures.

In one possible implementation, a pool of regression losses may be performed as $$L^{MR} = \sum_m \left\| \varsigma_m^{MR} - H_m^{MR}(z_i, z_j) \right\| \tag{8}$$

where $$\varsigma_m^{MR} \in \mathbb{R}$$

is the value for measure m computed on $\{x_i, x_j\}$. In some examples, $$\varsigma_m^{MR}$$

may be normalized to have zero mean and unit variance based on training data, if necessary. Some possible examples for the reference-based measures may include (but are not limited to) perceptual evaluation of speech quality (PESQ), composite measure for signal (CSIG), composite measure for noise (CBAK), composite measure for overall quality (COVL), segmental signal-to-noise ratio (SSNR), log-likelihood ratio (LLR), weighted slope spectral distance (WSSD), short-term objective intelligibility (STOI), scale-invariant signal distortion ratio (SISDR), Mel cepstral distortion, and log-Mel-band distortion. Of course, any other suitable reference-based and/or reference-free quality measures may be used, as will be appreciated by the skilled person.

Notably, it should be understood that each of the audio samples in the training set may be used in one or more (but not necessarily all) of the above illustrated plurality of loss functions. That is to say, some of the audio samples in the training set may be reused or shared by one or more of the loss functions. This is also reflected and shown in FIG. 1B. For instance, (algorithmically generated) audio samples 1142 for calculating loss function indicative of the score consistency head (metric) 1123 may be reused when calculating the loss function indicative of the degradation condition head (metric) 1124, or vice versa. As such, efficiency in training the system may be significantly improved. Furthermore, it should be noted that, in some cases, it may be further configured to generate a final (overall) loss function for the training process based on one or more of the plurality of loss functions, for example by exploiting an averaging process on those loss functions. As will be appreciated by the skilled person, any other suitable means or process may be used to generate such final loss function based on any number of suitable loss functions, depending on various implementations and/or requirements.

Also, it is further to be noted that the above illustrated multiple heads 1121-1128 may consist of either linear layers or MLPs (e.g., two-layer MLPs) with any suitable number of units (e.g., 400), possibly also all with BN at the end. In some cases, it may be preferred to use simple heads in order to encourage the encoder, and not the heads, to learn high-level features that can be successfully exploited even by networks with limited capacity. In some cases, the decision of whether to use a linear layer or an MLP may be based on the idea that the more relevant the auxiliary task, the less capacity should the head have. This way, in some implementations, a linear layer for the scores (i.e., 1131) and the JND and DT heads (i.e., 1133 and 1134, respectively) may be empirically chosen. Notice that setting linear layers for these three heads may provide interesting properties to the latent space, making it reflect 'distances' between latent representations, due to s and $L^{JND}$, and promoting groups/clusters of degradation types, due to $L^{DT}$. Of course, any other suitable configuration may be applied thereto, as will be appreciated by the skilled person.

Figure 2:
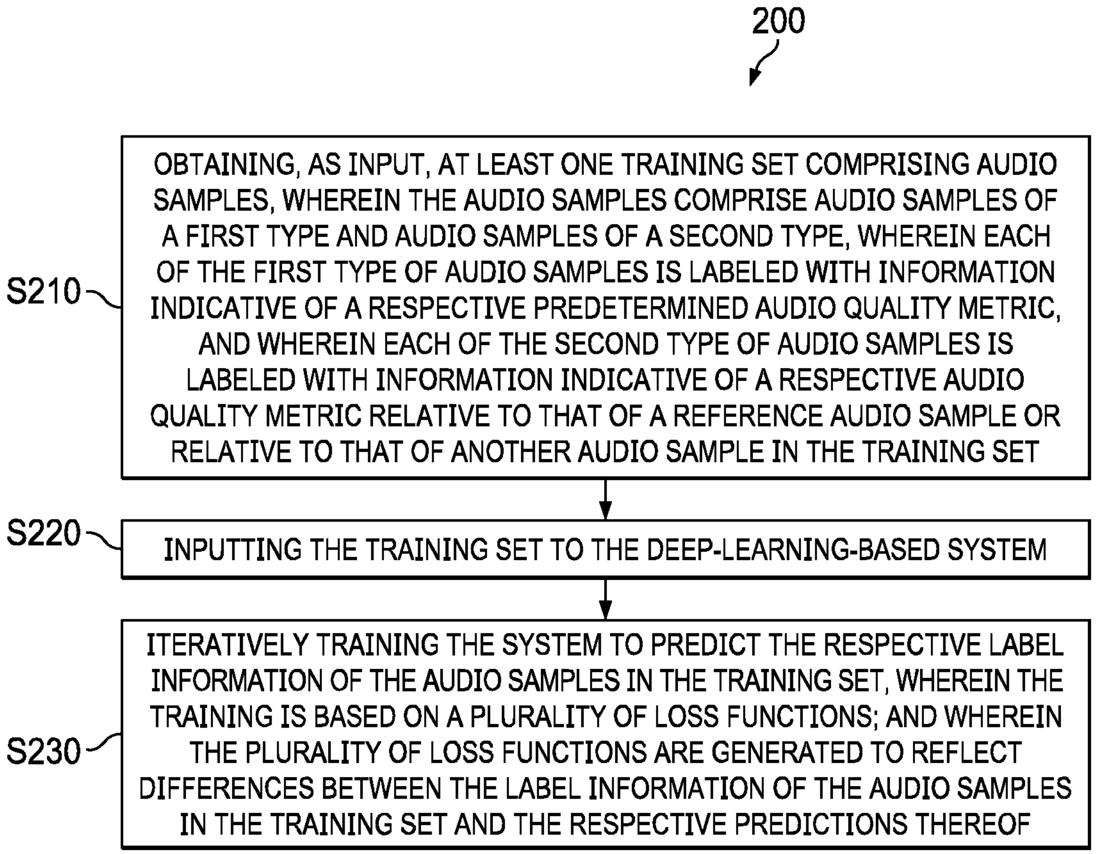
FIG. 2 is a flowchart illustrating an example of a method of training a deep-learning-based system for determining an indication of an audio quality of an audio input according to an embodiment of the disclosure.

FIG. 2 is a flowchart illustrating an example of a method 200 of training a deep-learning-based (e.g., neural-network-based) system for determining an indication of an audio quality of an audio input according to an embodiment of the disclosure. The system may for example be the same as or similar to the system 100 as shown in FIG. 1A or system 110 as shown in FIG. 1B.

In particular, the method 200 starts with step S210 by obtaining, as input, at least one training set comprising audio samples. More particularly, the audio samples may comprise audio samples of a first type and audio samples of a second type, wherein each of the first type of audio samples is labelled with information indicative of a respective predetermined audio quality metric, and wherein each of the second type of audio samples is labelled with information indicative of a respective audio quality metric relative to that of a reference audio sample (e.g., relative to that of another audio sample in the training set). As indicated above, the reference audio sample used here may be, but does not necessarily have to be, another audio sample in the training set. In other words, the reference audio sample may be an external reference audio sample (i.e., not in the training set) or an internal reference audio sample (i.e., within the training set), as will be understood and appreciated by the skilled person.

Such training set comprising the required audio samples (together with appropriate label information) may be obtained (generated) in any suitable manner, as will be appreciated by the skilled person. For instance, for the first type of audio samples, human annotated audio data (samples, signals, frames) may be used, which may be obtained internally (e.g., by audio experts, regular listeners, or mechanical turker) or externally (e.g., using publicly-available data sets). As examples, such human annotated audio data may be MOS data, JND data, etc. Further information regarding possible data set to be used as the human annotated can also be found for example in sections B.1 and B.2 of the enclosed appendix. On the other hand, for the second type of audio samples, programmatically generated audio data (samples, signals, frames) may be used, some examples of which have been illustrated above. Further information regarding possible data set to be used as the programmatically generated can also be found for example in section B.3 of the enclosed appendix.

The method 200 then continues with step S220 by inputting the training set to the deep-learning-based (neural-network-based) system, such as input x 1000 in FIG. 1A or x 1100 in FIG. 1B.

Subsequently, the method 200 performs step S230 of iteratively training the system to predict the respective label information of the audio samples in the training set. In particular, the training may be performed based on a plurality of loss functions and the plurality of loss functions may be generated to reflect differences between the label information of the audio samples in the training set and the respective predictions thereof, as illustrated above with reference to FIG. 1B.

Generally speaking, the whole network/system may be trained end-to-end, using for example stochastic gradient descent methods and backpropagation. Before training, a pool of audio samples may be taken as illustrated above and several degradations may be performed to them. As will be appreciated by the skilled person, various suitable degradations being applied thereto may include, but is not limited to operations/processes involving reverberation, clipping, encoding them with different codecs, phase distortion, reversing it, adding (real or artificial) background noise, etc. Some possible degradations are given below as examples, but not as limitation:

- Additive real noise (coming from different sources).
- Additive artificial noise (generated colored noise).
- Additive tone/hum noise.
- Audio resampling.
- Mu-law quantization.
- Clipping.
- Audio reversing.
- Inserting silences.
- Inserting noise.
- Inserting attenuations.
- Perturbing amplitudes.
- Delay.
- Equalization, band pass, band reject filtering.
- Low/high pass filtering.
- Chorus.
- Overdrive.
- Phaser.
- Pitch shift.
- Reverb.
- Tremolo.
- Phase distortions: Griffin-Lim, random phase, shuffled phase, spectrogram holes, spectrogram convolution.
- Transcoding (coding with an audio codec and re-coding back).

Notably, degradations may be applied to the full audio frame or to just some part of it, in a non-stationary manner. Also, in some cases, some existing (automatic) measures may be run on pairs of those audios. The main use of automatically-generated data is to complement human annotated data, but one could still train the disclosed network or system without one of the two and still obtain reasonable results with minimal adaptation.

Further information regarding possible degradation functions and optionally their corresponding degradation strength can also be found for example in section C of the enclosed appendix.

The system may be trained in any suitable manner in accordance with any suitable configuration or set. For instance, in some possible implementations, the system may be trained with the RangerQH optimizer, e.g., by using default parameters and a learning rate of $10^{-3}$. The learning rate may be decayed by a factor (e.g., of ⅕ at 70 and 90% of training). Further, to favor generalization and slightly improve performance, stochastic weight averaging may also be employed during the last training epoch, if necessary. Since generally after a few iterations all losses may be within a similar scale, loss weighting may not be performed.

Figure 3:
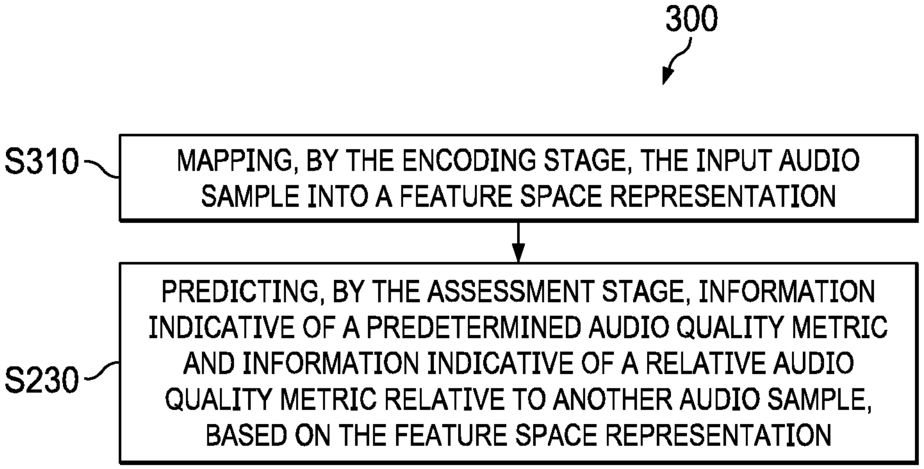
FIG. 3 is a flowchart illustrating an example of a method of operating a deep-learning-based system for determining an indication of an audio quality of an input audio sample according to an embodiment of the disclosure.

Once training is finished, the trained system may then be used or operated for determining a quality indication metric for an input audio. Reference is now made to FIG. 3, where a flowchart illustrating an example of a method 300 of training a deep-learning-based (e.g., neural-network-based) system for determining an indication of an audio quality of an audio input according to an embodiment of the disclosure is shown. The system may for example be the same as or similar to the system 100 as shown in FIG. 1A or system 110 as shown in FIG. 1B. That is, the system may comprise a suitable encoding stage and a suitable assessment stage as shown in either figure. Also, the system may have undergone the training process as illustrated for example in FIG. 2. Thus, repeated description thereof may be omitted for reasons of conciseness.

In particular, the method 300 may start with step S310 of mapping, by the encoding stage, the input audio sample into a feature space representation (e.g., the latent space representations z as illustrated above).

Then, the method 300 may continue with step S320 of predicting, by the assessment stage, information indicative of a predetermined audio quality metric and information indicative of a relative audio quality metric relative to a reference audio sample, based on the feature space representation. The predicted information (e.g., that indicative of a relative audio quality metric relative to a reference audio sample) may be used to further training (regularizing) the system, as illustrated in detail above with reference to FIG. 1B.

As such, a final quality metric such as a score (e.g., the score s 1140 as shown in FIG. 1B) may be generated, such that the output metric (or score) may be then used as an indication of the quality of the input audio sample. As mentioned above, the metric (or score) may be generated as any suitable representation, such as a value between 1 and 5 (e.g., with either 1 or 5 being indicative of the highest audio quality).

Summarizing, broadly speaking, the present disclosure proposes to learn a model of speech quality that combines multiple objectives, following a semi-supervised approach. In some cases, the disclosed approach may sometimes also be simply referred to a semi-supervised speech quality assessment (or SESQA for short). In particular, the present disclosure learns from existing labeled data, together with (theoretically limitless) amounts of unlabeled or programmatically generated data, and produces speech quality scores, together with usable latent features and informative auxiliary outputs. Scores and outputs are concurrently optimized in a multitask setting by a number of different but complementary objective criteria, with the idea that relevant cues are present in all of them. By flowing information through a shared latent space bottleneck, the considered objectives learn to cooperate, and promote better and more robust representations while discarding non-essential information.

Notably, the present disclosure may be exploited in several ways, for instance (but not limited to):

- As a cloud API, to obtain a quality score of an uploaded audio.
- As a tool to monitor communication.
- As a tool to monitor codec degradation.
- As a (e.g., internal) tool to assess performance of audio processing algorithms.
- As a loss function to train or regularize deep learning models (e.g., neural network models).
- As a feature extractor to know which type of distortion is present in an audio signal.

Of course, any other suitable use case may be exploited, as will be understood and appreciated by the skilled person.

FIGS. 4-8 are example illustrations showing various results and comparisons based on the embodiment(s) of the disclosure, respectively. Particularly, quantitative comparisons are performed with a number of existing or conventional approaches. In particular, details relating to some of the existing approaches that are used for comparison can be found for example in section D of the enclosed appendix.

Also, it is to be noted that for the purpose of evaluating, the present disclosure generally uses 3 MOS data sets, two internal and a publicly-available one. The first internal data set consists of 1,109 recordings and a total of 1.5 h of audio, featuring mostly user-generated content (UGC). The second internal dataset consists of 8,016 recordings and 15 h of audio, featuring telephony and VoIP degradations. The third data set is TCD-VoIP, which consists of 384 recordings and 0.7 h of audio, featuring a number of VoIP degradations. Another data set that we use is the JND data set, which consists of 20,797 pairs of recordings and 28 h of audio. More details for the training set can be found for example in section B of the enclosed appendix. For the programmatic generation of data, the present disclosure generally uses a pool of internal and public data sets, and generates 70,000 quadruples conforming 78 h audio. Further, a total of 37 possible degradations are employed, including additive background noise, hum noise, clipping, sound effects, packet losses, phase distortions, and a number of audio codecs (more details can be found for example in section C of the enclosed appendix). The present disclosure is then compared with ITU-P563, two approaches based on feature losses, one using JND (FL-JND) and another one using PASE (FL-PASE), SRMR, AutoMOS, Quality-Net, WEnets, CNN-ELM, and NISQA. For evaluation purpose, some of them have been re-implemented to fit the training and evaluation pipelines of the present disclosure and have been adapted to work at 48 kHz, if needed/possible. It is noted that FL, AutoMOS, and NISQA generally make use of partial additional data beyond MOS, thus being weakly semi-supervised approaches. More details on baseline approaches can be also found for example in section D of the enclosed appendix.

All approaches have been put under the same setting, choosing their best optimizers and hyper-parameters on the validation set. They are trained with weakly-labeled frames of 1 s for 5 epochs, by performing data augmentation and reusing MOS data inside an epoch (e.g., an epoch may be defined as a full pass over the programmatically generated data). Random scaling, phase inversion, and temporal sampling may also be used as data augmentation. For evaluation, $L^{MOS}$ and $L^{CONS}$ are used, and the ratio of incorrectly classified rankings $R^{RANK}$ are computed ($R^{RANK}$ instead $L^{RANK}$ is reported for interpretability). In addition, we compute a summary error $E^{TOTAL}=0.5L^{MOS}+R^{RANK}+L^{CONS}$ (the 0.5 weight is introduced to compensate for the different range). 5-fold cross-validation is also performed and average errors are the reported.

Of course, it should be understood that any other suitable training data sets and/or evaluation means may be adopted, according to various implementations and/or requirements.

According to those results, the approach disclosed in the present disclosure seems to outperform those in the evaluation metrics that have been considered. It is also observed that the scores obtained from the score head correlate well with human judgments of quality, that they are able to detect different levels of degradation for a number of distortions, and that the latent space z clusters degradation types.

Figure 4:
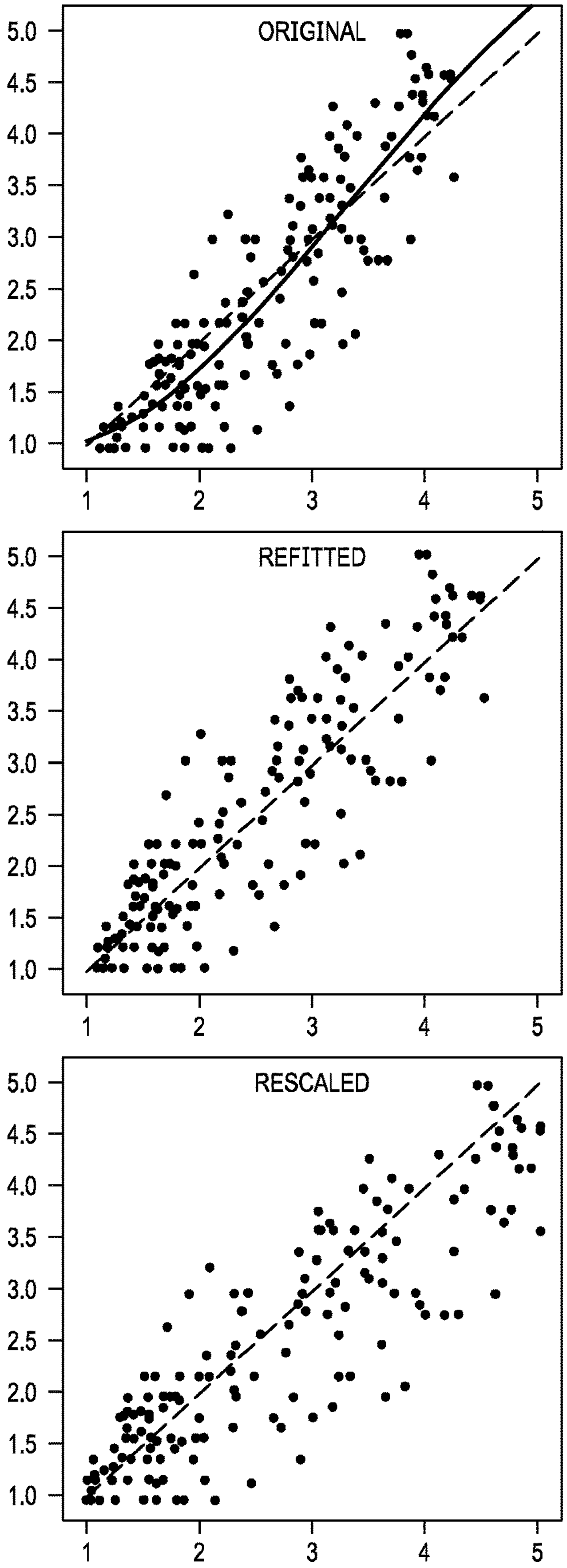

For example, FIG. 4 generally shows that the scores seem to correlate well with human judgments.

Figure 5:
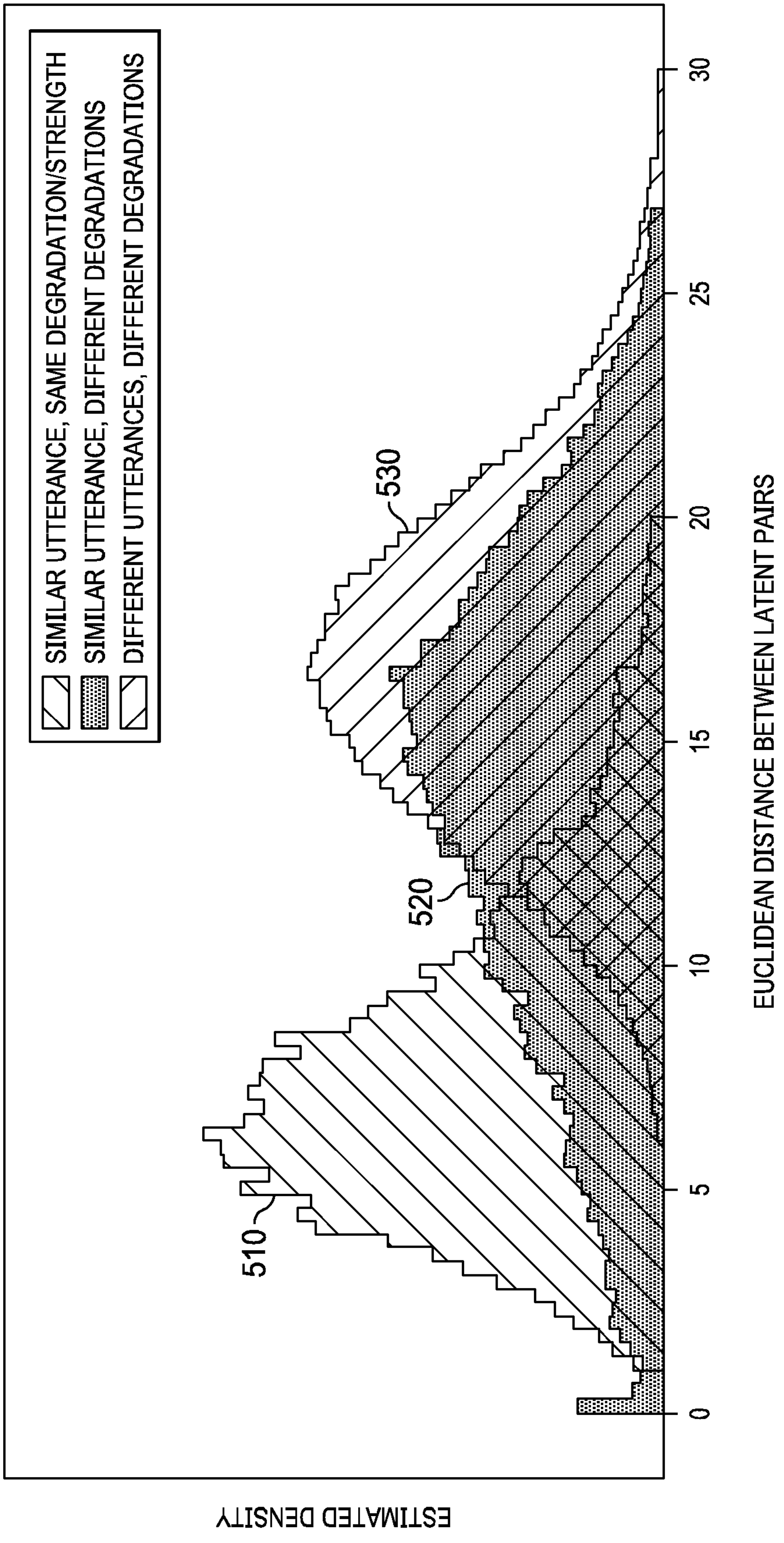

FIG. 5 shows the empirical distribution of distances between latent space vectors z. It may be seen from diagram 510 that smaller distances correspond to similar utterances with the same degradation type and strength (e.g., with an average distance of 7.6 and a standard deviation of 3.4), and from diagram 530 that larger distances correspond to different utterances with different degradations (e.g., with an average distance of 16.9 and a standard deviation of 3.9). The overlap between the two seems small, with mean plus one standard deviation not crossing each other. Similar utterances that have different degradations (diagram 520) are spread between the previous two distributions (e.g., with an average distance of 13.7 and a standard deviation of 5.5). That makes sense in a latent space that is organized by degradation and strengths, with a wide range between small and large strengths. It may be assumed that this overall behavior may be a consequence of all losses, but in particular of s and $L^{JND}$ and their (linear) heads.

Figure 6A:
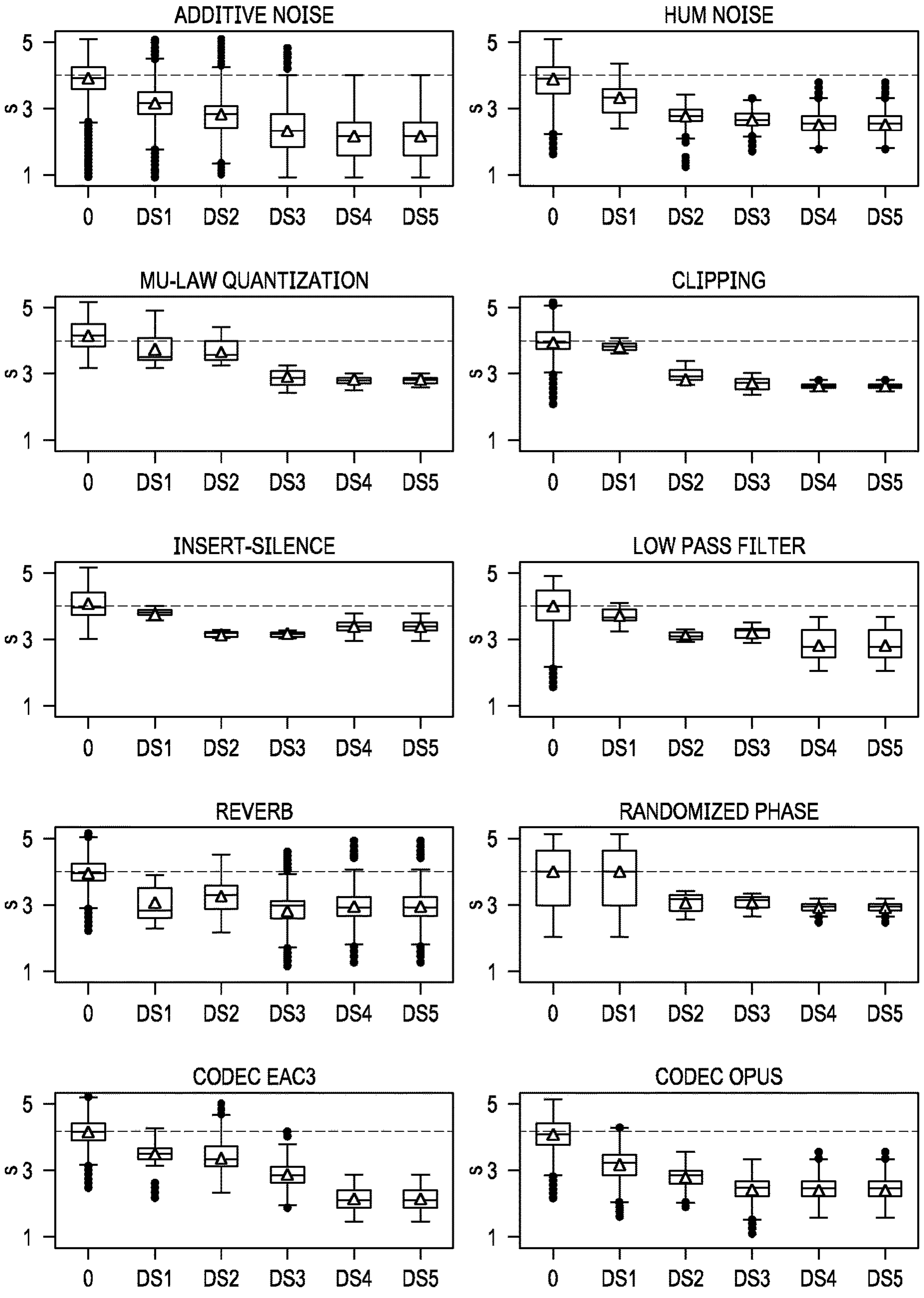
Figure 6B:
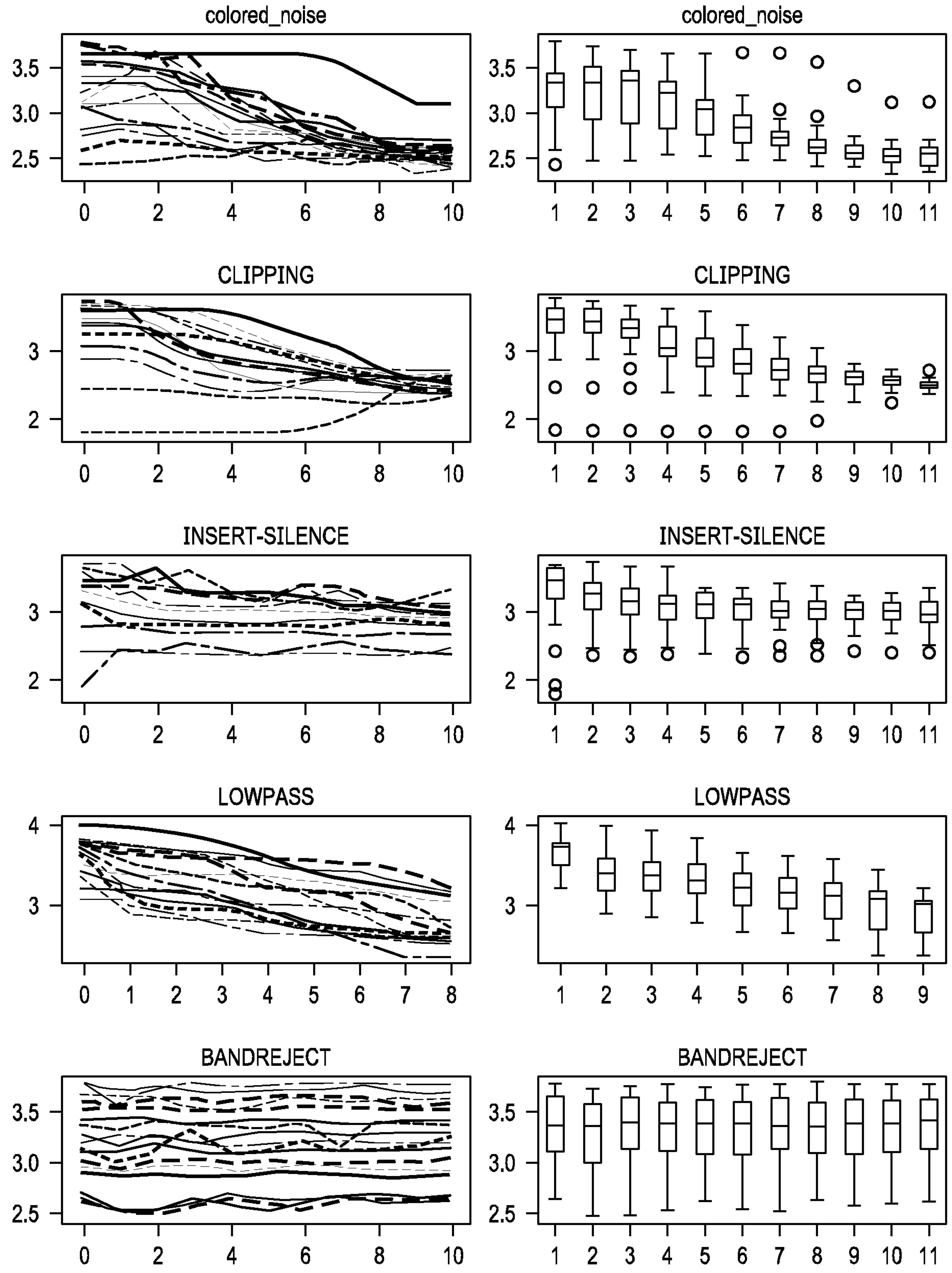
Figure 6C:
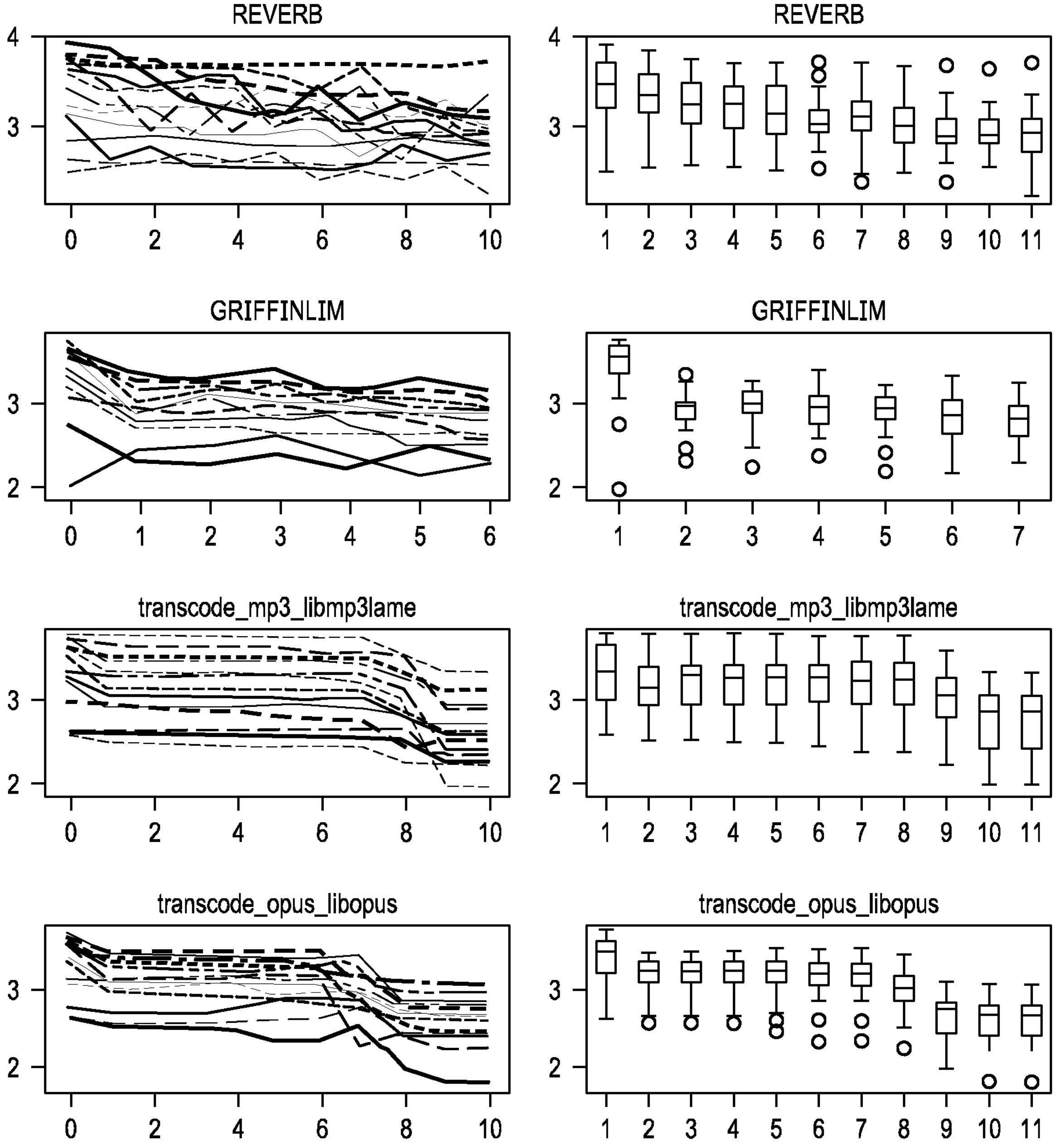

FIG. 6A depicts how scores s, computed from test signals with no degradation, seem to tend to get lower while increasing degradation strength. In a number of cases, the effect seems to be both clearly visible and consistent (for instance additive noise or the EAC3 codec). In other cases, the effect seems to saturate for high strengths (for instance μ-law quantization or clipping). There seem to be also a few degradations where strength does not correspond to a single variable, and thus the effect seems to not clearly apparent. Overall, a consistent behavior across degradations and strengths is observed. It may be assumed that $L^{MOS}$, $L^{RANK}$, and $L^{DS}$ may be the main driving forces to achieve this behavior. FIGS. 6B and 6C schematically show similar additional results where scores seem to reflect well progressive audio degradation.

Figure 7A:
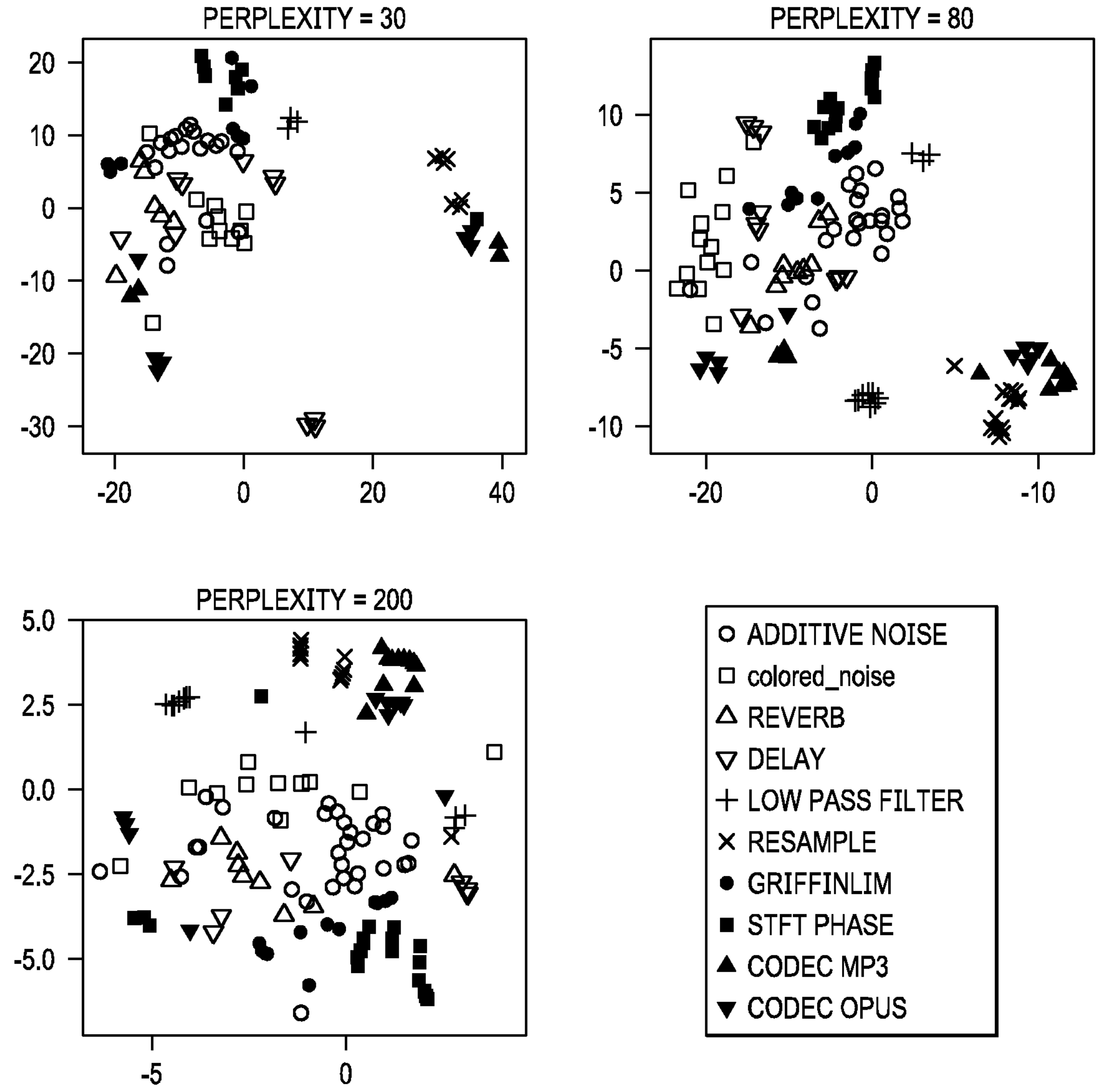

FIG. 7A shows three low dimensional t-SNE projections of latent space vectors z. In the figure, it may be seen how different degradation types group or cluster together. For instance, with a perplexity of 200, it may be seen that latent vectors of frames that contain additive noise group together in the center. Interestingly, it can also be seen that similar degradations may be placed close to each other. That is the case, for instance, of additive and colored noise, MP3 and OPUS codecs, or Griffin-Lim and STFT phase distortions, respectively. It may be assumed that this clustering behavior may be a direct consequence of $L^{DT}$ and its (linear) head.

Figure 7B:
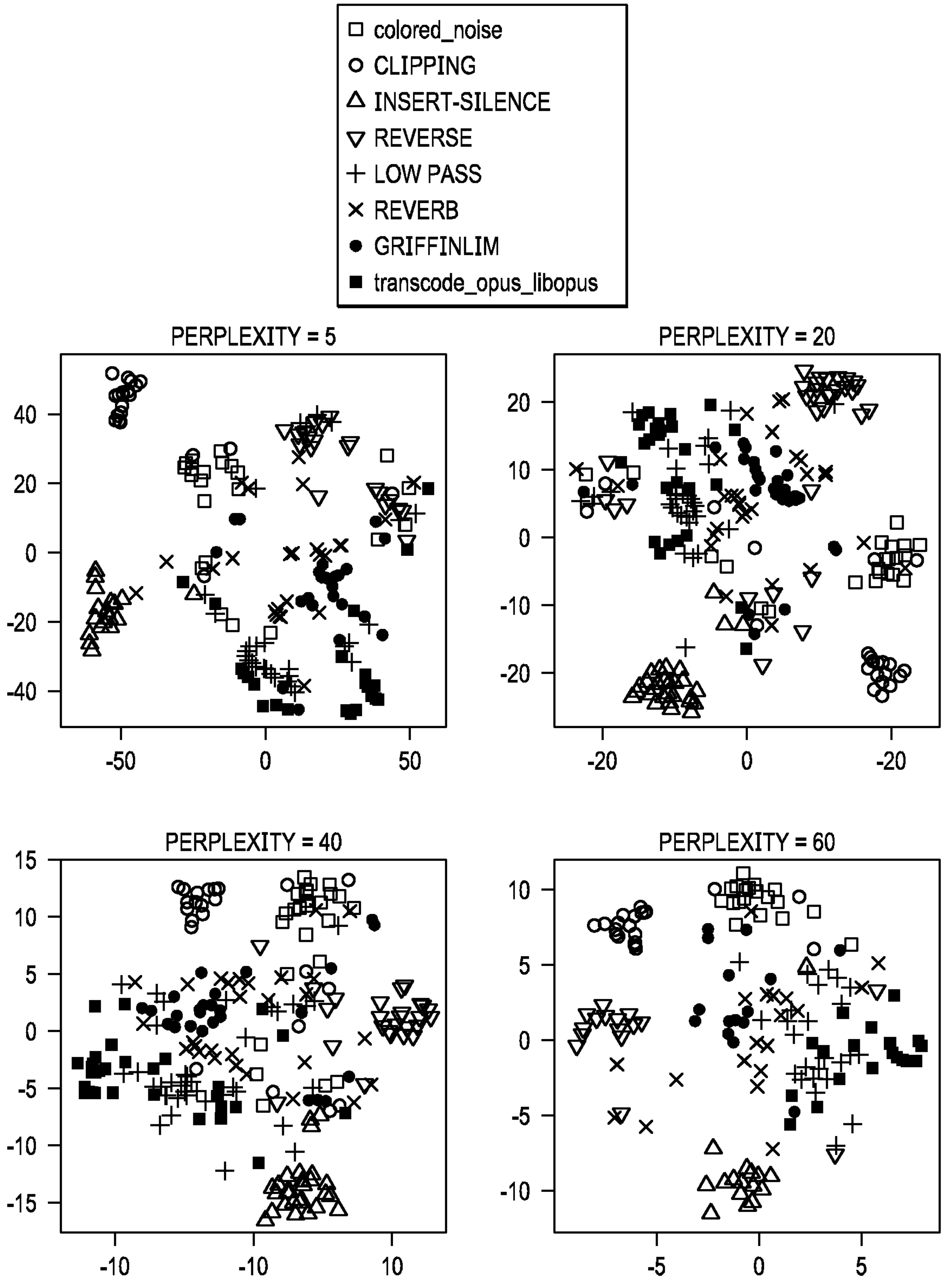

FIG. 7B schematically shows similar additional results where classification heads seem to have the potential to distinguish between types of degradation.

FIG. 8A schematically shows comparison with some of the existing or conventional approaches. From FIG. 8A, it is overall observed that all approaches seem to clearly outperform the random baseline, and that around half of them seem to achieve an error comparable to the variability between human scores ($L^{MOS}$ estimated by taking the standard deviation across listeners and averaging across utterances). It is also observed that many of the existing approaches report decent consistencies, with $L^{CONS}$ in the range of 0.1, six times lower than the random baseline. However, existing approaches yield considerable errors when considering relative pairwise rankings ($R^{RANK}$). The present disclosure seems to outperform all listed existing approaches in all considered evaluation metrics by a large margin, including the standard $L^{MOS}$. The only exception to the previous statement seems to be with the $L^{CONS}$ metric of the ITU-P563 approach, which seems to nonetheless have a high $L^{CONS}$ and an almost random $R^{RANK}$. Considering the summary metric $E^{TOTAL}$, the present disclosure seems to cut the error of the best existing approach by 36%.

FIG. 8B schematically shows the effect that the considered criteria/tasks have on the performance of the disclosed method of the present disclosure. First of all, it is observed that errors seem to never decrease by removing a single criterion. This may indicate that none of them seems to be harmful in terms of performance. Next, it is observed that there are some relevant criteria that, if removed, have a considerable impact (for example $L^{MOS}$ and $L^{RANK}$). However, the absence of one of such relevant criteria does not yet produce the average error of existing approaches (see for example $E^{TOTAL}$ in FIG. 8A). Regarding some of the less relevant tasks, it is noted that they seem to be still found useful for the outputs that they produce (for example, knowing if a pair of signals present a JND difference) or for the properties they confer to the organization of the latent space z. Finally, it is also interesting to highlight that considering the $L^{MOS}$ criterion alone (see last row of FIG. 8B) seems to yield a performance that is on par with some of the best-performing existing approaches (see for example NISQA and CNN-ELM in FIG. 8A). Overall, this demonstrates that considering multiple optimization criteria and tasks seems to be key for achieving outstanding performance, and empirically justifies a semi-supervised approach to audio quality assessment like the present disclosure.

FIG. 8C schematically shows results of further assessing the generalization capabilities of the considered approaches, by performing a post-hoc informal test with out-of-sample data. For that, 20 new recordings may be chosen for example from UGC, featuring clean or production-quality speech, and speech with degradations such as real background noise, codec artifacts, or microphone distortion. Then, a new set of listeners may be asked to rate the quality of the recordings with a score between 1 and 5, and compare their ratings with the ones produced by models pre-trained on our internal UGC data set. It may be seen from FIG. 8C that the ranking of existing approaches changes, showing that some are better than others at generalizing to out-of-sample data. Nonetheless, the present disclosure seems to still outperform them in all listed metrics and by a large margin. Noticeably, it seems to cut the $L^{MOS}$ of the best listed existing approach by 21%, which is much more than the relative $L^{MOS}$ difference observed for in-sample data, which was 7% (from FIG. 8A). This may indicate that the present disclosure generalize better to out-of-sample but related data.

FIGS. 8D and 8E further schematically show error values for the considered data sets, together with the $L^{TOTAL}$ average across data sets. In particular, FIG. 8D schematically compares the present disclosure with existing approaches and FIG. 8E schematically shows the effect of training without one of the considered losses, in addition to using only $L^{MOS}$. Notably, similar as mentioned above, $E^{TOTAL}=0.5L^{MOS}+R^{RANK}+L^{CONS}$. FIG. 8F further provides some additional results which schematically show that the proposed approach of the present disclosure (last row) seems to outperform the listed conventional approaches.

In the above, possible methods of training and operating a deep-learning-based (e.g., neural-network-based) system for determining an indication of an audio quality of an input audio sample, as well as possible implementations of such system have been described. Additionally, the present disclosure also relates to an apparatus for carrying out these methods. An example of such apparatus may comprise a processor (e.g., a central processing unit (CPU), a graphics processing unit (GPU), a digital signal processor (DSP), one or more application specific integrated circuits (ASICs), one or more radio-frequency integrated circuits (RFICs), or any combination of these) and a memory coupled to the processor. The processor may be adapted to carry out some or all of the steps of the methods described throughout the disclosure.

The apparatus may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions (sequential or otherwise) that specify actions to be taken by that apparatus. Further, the present disclosure shall relate to any collection of apparatus that individually or jointly execute instructions to perform any one or more of the methodologies discussed herein.

The present disclosure further relates to a program (e.g., computer program) comprising instructions that, when executed by a processor, cause the processor to carry out some or all of the steps of the methods described herein.

Yet further, the present disclosure relates to a computer-readable (or machine-readable) storage medium storing the aforementioned program. Here, the term "computer-readable storage medium" includes, but is not be limited to, data repositories in the form of solid-state memories, optical media, and magnetic media, for example.

Unless specifically stated otherwise, as apparent from the following discussions, it is appreciated that throughout the disclosure discussions utilizing terms such as "processing", "computing", "calculating", "determining", "analyzing" or the like, refer to the action and/or processes of a computer or computing system, or similar electronic computing devices, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one example embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The processing system may also encompass a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one or more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code. Furthermore, a computer-readable carrier medium may form, or be included in a computer program product.

In alternative example embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a Personal Digital Assistant (PDA), a cellular telephone, a web appliance, a network router, switch or bridge, or any machine capable of executing a set of instructions (sequential or otherwise) that specify actions to be taken by that machine.

Note that the term "machine" shall also be taken to include any collection of machines that individually or jointly execute a set (or multiple sets) of instructions to perform any one or more of the methodologies discussed herein.

Thus, one example embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, example embodiments of the present disclosure may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present disclosure may take the form of a method, an entirely hardware example embodiment, an entirely software example embodiment or an example embodiment combining software and hardware aspects. Furthermore, the present disclosure may take the form of carrier medium (e.g., a computer program product on a computer-readable storage medium) carrying computer-readable program code embodied in the medium.

The software may further be transmitted or received over a network via a network interface device. While the carrier medium is in an example embodiment a single medium, the term "carrier medium" should be taken to include a single medium or multiple media (e.g., a centralized or distributed database, and/or associated caches and servers) that store the one or more sets of instructions. The term "carrier medium"

shall also be taken to include any medium that is capable of storing, encoding or carrying a set of instructions for execution by one or more of the processors and that cause the one or more processors to perform any one or more of the methodologies of the present disclosure. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media may also take the form of acoustic or light waves, such as those generated during radio wave and infrared data communications. For example, the term "carrier medium" shall accordingly be taken to include, but not be limited to, solid-state memories, a computer product embodied in optical and magnetic media; a medium bearing a propagated signal detectable by at least one processor or one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one example embodiment by an appropriate processor (or processors) of a processing (e.g., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Reference throughout this disclosure to "one example embodiment", "some example embodiments" or "an example embodiment" means that a particular feature, structure or characteristic described in connection with the example embodiment is included in at least one example embodiment of the present disclosure. Thus, appearances of the phrases "in one example embodiment", "in some example embodiments" or "in an example embodiment" in various places throughout this disclosure are not necessarily all referring to the same example embodiment. Furthermore, the particular features, structures or characteristics may be combined in any suitable manner, as would be apparent to one of ordinary skill in the art from this disclosure, in one or more example embodiments.

As used herein, unless otherwise specified the use of the ordinal adjectives "first", "second", "third", etc., to describe a common object, merely indicate that different instances of like objects are being referred to and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of example embodiments of the disclosure, various features of the disclosure are sometimes grouped together in a single example embodiment, Fig., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed example embodiment. Thus, the claims following the Description are hereby expressly incorporated into this Description, with each claim standing on its own as a separate example embodiment of this disclosure.

Furthermore, while some example embodiments described herein include some but not other features included in other example embodiments, combinations of features of different example embodiments are meant to be within the scope of the disclosure, and form different example embodiments, as would be understood by those skilled in the art. For example, in the following claims, any of the claimed example embodiments can be used in any combination.

In the description provided herein, numerous specific details are set forth. However, it is understood that example embodiments of the disclosure may be practiced without these specific details. In other instances, well-known methods, structures and techniques have not been shown in detail in order not to obscure an understanding of this description.

Thus, while there has been described what are believed to be the best modes of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

Enumerated example embodiments ("EEEs") of the present disclosure have been described above in relation to methods and systems for determining an indication of an audio quality of an audio input. Thus, an embodiment of the present invention may relate to one or more of the examples, enumerated below:

EEE 1. A method for training a convolutional neural network (CNN) to determine an audio quality rating for an audio signal, the method comprising:

- transforming the audio signal into a low-dimensional latent space representation audio signal;
- inputting the low-dimensional latent space representation audio signal into an encoder stage;
- processing, via the encoder stage, the low-dimensional latent space representation audio signal to determine parameters of the low-dimensional latent space representation audio signal;
- determining, based on the parameters and the low-dimensional latent space representation audio signal, an audio quality score of the audio signal.

EEE 2. A method of training a deep-learning-based system for determining an indication of an audio quality of an audio input, the method comprising:

obtaining, as input, at least one training set comprising audio samples, wherein the audio samples comprise audio samples of a first type and audio samples of a second type, wherein each of the first type of audio samples is labelled with information indicative of a respective predetermined audio quality metric, and wherein each of the second type of audio samples is labelled with information indicative of a respective audio quality metric relative to that of a reference audio sample or relative to that of another audio sample in the training set;

inputting the training set to the deep-learning-based system; and iteratively training the system to predict the respective label information of the audio samples in the training set, wherein the training is based on a plurality of loss functions; and wherein the plurality of loss functions are generated to reflect differences between the label information of the audio samples in the training set and the respective predictions thereof.

EEE 3. The method according to EEE 2, wherein the first type of audio samples comprise human annotated audio samples each being labelled with the information indicative of the respective predetermined audio quality metric.

EEE 4. The method according to EEE 3, wherein the human annotated audio samples comprise mean opinion score, MOS, audio samples and/or just-noticeable difference, JND, audio samples.

EEE 5. The method according to any one of the preceding EEEs, wherein the second type of audio samples comprise algorithmically generated audio samples each being labelled with the information indicative of the relative audio quality metric.

EEE 6. The method according to EEE 5, wherein each of the algorithmically generated samples is generated by selectively applying at least one degradation function each with a respective degradation strength to a reference audio sample or to another algorithmically generated audio sample, and wherein the label information comprises information indicating the respective degradation function and/or the respective degradation strength that have been applied thereto.

EEE 7. The method according to EEE 6, wherein the label information further comprises information indicative of degradation relative to the reference audio sample or to the other audio sample in the training set.

EEE 8. The method according to EEE 6 or 7, wherein the degradation function is selected from a plurality of available degradation functions, and/or wherein the respective degradation strength is set such that, at its minimum, the degradation is perceptually noticeable.

EEE 9. The method according to EEE 8, wherein the plurality of available degradation functions comprise functions relating to one or more of: reverberation, clipping, encoding with different codecs, phase distortion, audio reversing, and background noise.

EEE 10. The method according to any one of EEEs 6 to 9, wherein the algorithmically generated audio samples are generated as pairs of audio frames $\{x_i, x_j\}$ and/or quadruples of audio frames $\{x_{i_k}, x_{i_l}, x_{j_k}, x_{j_l}\}$, wherein the audio frame $x_i$ is generated by selectively applying at least one degradation function each with a respective degradation strength to a reference audio frame, wherein the audio frame $x_j$ is generated by selectively applying at least one degradation function each with a respective degradation strength to the audio frame $x_i$, wherein the audio frames $x_{i_k}$ and $x_{i_l}$ are extracted from audio frame $x_i$ by selectively applying a respective time delay to the audio frame $x_i$, and wherein the audio frames $x_{i_k}$ and $x_{j_l}$ are extracted from audio frame $x_j$ by selectively applying a respective time delay to the audio frame $x_j$.

EEE 11. The method according to any one of the preceding EEEs, wherein the loss functions comprise a first loss function indicative of a MOS error metric, and wherein the first loss function is calculated based on a difference between a MOS ground truth of an audio sample in the training set and a prediction of the audio sample.

EEE 12. The method according to any one of EEEs 5 to 10 or EEE 11 when depending on any one of EEEs 5 to 10, wherein the label information of the second type of audio samples comprises relative information indicative of whether one audio sample is more degraded than another audio sample, wherein the loss functions comprise a second loss function indicative of a pairwise ranking metric, and wherein the second loss function is calculated based on a ranking established by the label information comprising the relative degradation information and the prediction thereof.

EEE 13. The method according to EEE 12, wherein the system is trained in such a manner that one less degraded audio sample gets an audio quality metric indicative of a better audio quality than another more degraded audio sample.

EEE 14. The method according to any one of EEEs 5 to 10, 12 and 13, or EEE 11 when depending on any one of EEEs 5 to 10, wherein the label information of the second type of audio samples comprises relative information indicative of perceptual relevance between audio samples, wherein the loss functions comprise a third loss function indicative of a consistency metric, and wherein the third loss function is calculated based on the difference between the label information comprising the perceptual relevance information and the prediction thereof.

EEE 15. The method according to EEE 14, wherein the consistency metric indicates whether two or more audio samples have the same degradation function and degradation strength, and correspond to the same time frame.

EEE 16. The method according to any one of EEEs 5 to 10 and 12 to 15, or EEE 11 when depending on any one of EEEs 5 to 10, wherein the label information of the second type of audio samples comprises relative information indicative of whether one audio sample has been applied with the same degradation function and the same degradation strength as another audio sample, wherein the loss functions comprise a fourth loss function indicative of a degradation condition metric, and wherein the fourth loss function is calculated based on the difference between the label information comprising the relative degradation information and the prediction thereof.

EEE 17. The method according to any one of EEEs 5 to 10 and 12 to 16, or EEE 11 when depending on any one of EEEs 5 to 10, wherein the label information of the second type of audio samples comprises relative information indicative of perceptual difference relative to one another, wherein the loss functions comprise a fifth loss function indicative of a JND metric, and wherein the fifth loss function is calculated based on the difference between the label information comprising the relative perceptual difference and the prediction thereof.

EEE 18. The method according to any one of EEEs 5 to 10 and 12 to 17, or EEE 11 when depending on any one of EEEs 5 to 10, wherein the label information of the second type of audio samples comprises information indicative of the degradation function that has been applied to an audio sample, wherein the loss functions comprise a sixth loss function indicative of a degradation type metric, and wherein the sixth loss function is calculated based on difference between the label information comprising the respective degradation function information and the prediction thereof.

EEE 19. The method according to any one of EEEs 5 to 10 and 12 to 18, or EEE 11 when depending on any one of EEEs 5 to 10, wherein the label information of the second type of audio samples comprises information indicative of the degradation strength that has been applied to an audio sample, wherein the loss functions comprise a seventh loss function indicative of a degradation strength metric, and wherein the seventh loss function is calculated based on difference between the label information comprising the respective degradation strength information and the prediction thereof.

EEE 20. The method according to any one of the preceding EEEs, wherein the loss functions comprise an eighth loss function indicative of a regression metric, and wherein the regression metric is calculated according to at least one of reference-based and/or reference-free quality measures.

EEE 21. The method according to EEE 20, wherein the reference-based quality measures comprise at least one of: PESQ, CSIG, CBAK, COVL, SSNR, LLR, WSSD, STOI, SISDR, Mel cepstral distortion, and log-Mel-band distortion.

EEE 22. The method according to any one of the preceding EEEs, wherein each of the audio samples in the training set is used in at least one of the plurality of loss functions, and wherein a final loss function for the training is generated based on an averaging process of one or more of the plurality of loss functions.

EEE 23. The method according to any one of the preceding EEEs, wherein the system comprises an encoding stage for mapping the audio input into a feature space representation and an assessment stage for generating the predictions of label information based on the feature space representation.

EEE 24. The method according to any one of the preceding EEEs, wherein the encoding stage for generating the intermediate representation comprises a neural network encoder.

EEE 25. The method according to any one of the preceding EEEs, wherein each of the plurality of loss functions is determined based on a neural network comprising a linear layer or a multilayer perceptron, MLP.

EEE 26. A deep-learning-based system for determining an indication of an audio quality of an input audio sample, wherein the system comprises:

an encoding stage; and an assessment stage, wherein the encoding stage is configured to map the input audio sample into a feature space representation; and wherein the assessment stage is configured to, based on the feature space representation, predict information indicative of a predetermined audio quality metric and further predict information indicative of a relative audio quality metric relative to another audio sample.

EEE 27. The system according to EEE 26, wherein the system is configured to:

take, as input, at least one training set, wherein the training set comprises audio samples of a first type and audio samples of a second type, wherein each of the first type of audio samples is labelled with information indicative of a respective predetermined audio quality metric, and wherein each of the second type of audio samples is labelled with information indicative of a respective audio quality metric relative to that of a reference audio sample or relative to that of another audio sample in the training set;

input the training set to the system; and iteratively train the system, based on the training set, to predict the respective label information of the audio samples in the training set based on a plurality of loss functions that are generated to reflect differences between the label information of the audio samples in the training set and the respective predictions thereof.

EEE 28. A method of operating a deep-learning-based system for determining an indication of an audio quality of an input audio sample, wherein the system comprises an encoding stage and an assessment stage, the method comprising:

mapping, by the encoding stage, the input audio sample into a feature space representation; and predicting, by the assessment stage, information indicative of a predetermined audio quality metric and information indicative of a relative audio quality metric relative to another audio sample, based on the feature space representation.

EEE 29. A program comprising instructions that, when executed by a processor, cause the processor to carry out steps of the method according to any one of EEEs 1 to 25 and 28.

EEE 30. A computer-readable storage medium storing the program according to EEE 29.

EEE 31. An apparatus comprising a processor and a memory coupled to the processor, wherein the processor is adapted to cause the apparatus to carry out steps of the method according to any one of EEEs 1 to 25 and 28.

APPENDIX

Appendix A. Computing Scores with a Reference Signal

To compute scores s in a reference-based setting instead of a reference-free one, the two signals $x_i$ and $x_j$ are passed through the encoder to obtain the corresponding latents $z_i$ and $z_j$. Then, for instance, $s_{ij}=1+4\sigma(w^T z_i - w^T z_i + b)$ is computed, using a linear unit for both latents. Other options are to compute a single score from a latent vector difference, $s_{ij}=1+4\sigma(w^T(z_i - z_j)+b)$, or to concatenate latents and use a layer that is double the size, $s_{ij}=1+4\sigma(w^T[z_i^T;\ z_j^T]^T+b)$. Additional perspectives include replacing vector differences or linear layers by more complicated nonlinear, parametric, and/or learnable functions.

Appendix B: Data

As mentioned, in the semi-supervised approach, three (3) types of data are employed: MOS data, JND data, and programmatically generated data. The additional out-of-sample data set used in the post-hoc listening test is summarized in the description, and its degradation characteristics resemble the ones in the internal UGC data set (see below).

B.1. MOS Data

The whole network/system is trained and evaluated on three (3) different MOS data sets of different size and characteristics:

1. Internal UGC data set—This data set consists of 1,109 recordings of UGC, adding up to a total of 1.5 h of audio. All recordings are converted to mono WAV PCM at 48 kHz and normalized to have the same loudness. Utterances range from single words to few sentences, uttered by both male and female speakers in a variety of conditions, using different languages (mostly English, but also Chinese, Russian, Spanish, etc.). Common degradations in the recordings include background noise (street, cafeteria, wind, background TV/radio, other people's speech, etc.), reverb, bandwidth reduction (low-pass down to 3 kHz), and coding artifacts (MP3, OGG, AAC, etc.). Quality ratings were collected with the help of a pool of 10 expert listeners with at least a few years of experience in audio processing/engineering. Recordings have between 4 and 10 ratings, which were obtained by following standard procedures like the ones described by IEEE and ITU (see P. C. Loizou, "Speech quality assessment," in Multimedia Analysis, Processing and Communications, ser. Studies in Computational Intelligence. Berlin, Germany: Springer, 2011, vol. 346, pp. 623-654 and references therein).
2. Internal telephony/VoIP data set—This data set consists of 8,016 recordings with typical telephony and VoIP degradations, adding up to a total of 15 h of audio. Besides a small percentage, all audios are originally recorded at 48 kHz before further processing and normalized to have the same loudness. Recordings contains two sentences separated by silence and have a duration between 5 and 15 s, following a protocol similar to ITU-P800. Male and female utterances are balanced and different languages are present (English, French, Italian, Czech, etc.). Common degradations include packet losses (between 20 and 60 ms), bandwidth reduction (low-pass down to 3 kHz), additive synthetic noise (different SNRs), and coding artifacts (G772, OPUS, AC3, etc.). Quality ratings are provided by a pool of regular listeners, with each recording having between 10 and 15 ratings. Ratings were obtained by following the standard procedure described by ITU (see P. C. Loizou, "Speech quality assessment," in Multimedia Analysis, Processing and Communications, ser. Studies in Computational Intelligence. Berlin, Germany: Springer, 2011, vol. 346, pp. 623-654 and references therein).
3. TCD-VoIP data set—This is a public dataset available online at http://www:mee:tcd:ie/~sigmedia/Resources/TCD-VoIP. It consists of 384 recordings with common VoIP degradations, adding up to a total of 0.7 h. A good description of the data set is provided in the original reference (N. Harte, E. Gillen, and A. Hines, "TCD-VoIP, a research database of degraded speech for assessing quality in VoIP applications," in Proc. of the Int. Workshop on Quality of Multimedia Experience (QoMEX), 2015). Despite also being VoIP degradations, a number of them differ from our internal telephony/VoIP data set (both in type and strength).

B.2. JND Data

JND data is also used for training. The data set compiled by Manocha et al. (P. Manocha, A. Finkelstein, Z. Jin, N. J. Bryan, R. Zhang, and G. J. Mysore, "A differentiable perceptual audio metric learned from just noticeable differences," ArXiv:2001.04460, 2020) is used, which is available at https://github:com/pranaymanocha/PerceptualAudio. The data set consists of 20,797 pairs of "perturbed" recordings (28 h of audio), each pair coming from the same utterance, with annotations of whether such perturbations are pairwise noticeable or not. Annotations were crowd-sourced from Amazon Mechanical Turk following a specific procedure (P. Manocha, A. Finkelstein, Z. Jin, N. J. Bryan, R. Zhang, and G. J. Mysore, "A differentiable perceptual audio metric learned from just noticeable differences," ArXiv: 2001.04460, 2020). Perturbations correspond to additive linear background noise, reverb, and coding/compression.

B.3. Programmatically Generated Data

The quadruples $\{x_{ik}, x_{il}, x_{jk}, x_{jl}\}$ are computed from programmatically generated data. To do so, a list of 10 data sets of audio at 48 kHz is used that are considered clean and without processing. This includes private/proprietary data sets, and public data sets such as VCTK (Y. Yamagishi, C. Veaux, and K. MacDonald, "CSTR VCTK Corpus: English Multi-speaker Corpus for CSTR Voice cloning toolkit (version 0.92)," University of Edinburgh, The Centre for Speech and Technology Research (CSTR), 2019. [Online]. Available: https://doi:org/10:7488/ds/2645), RAVDESS (S. R. Livingstone and F. A. Russo, "The Ryerson audio-visual database of emotional speech and song (RAVDESS)," PLoS ONE, vol. 13, no. 5, p. e0196391, 2018. [Online]. Available: https://zenodo:org/record/1188976), or TSP Speech (http://www-mmsp:ece:mcgill:ca/Documents/Data/). For the experiments of the present disclosure, 50,000 quadruples are used for training, 10,000 for validation, and 10,000 for testing. To form every quadruple, it proceeds as follows:

Uniformly sample a data set and uniformly sample a file from it.

Uniformly sample a 1.1 s frame, avoiding silent or majorly silent frames. Normalize it to have a maximum absolute amplitude of 1.

With probabilities 0.84, 0.12, and 0.04 sample zero, one, or two degradations from the pool of available degradations (see below). If zero degradations, the signal directly becomes xi. Otherwise, we uniformly choose a strength for each degradation and apply them sequentially to generate $x_i$.

With probabilities 0.75, 0.2, 0.04, and 0.01 sample one, two, three, or four degradations from the pool of available degradations (see below). Uniformly select strengths and apply them to $x_i$ sequentially to generate $x_j$.

Uniformly sample a time delay between 0 and 100 ms. Extract 1 s frames $x_{ik}$ and $x_{il}$ from $x_i$ using such delay, and do the same for $x_{jk}$ and $x_{jl}$ from $x_i$.

Store $\{x_{ik}, x_{il}, x_{jk}, x_{jl}\}$, together with the information of degradation type and strength.

In total, 78 h of audio: 1×4×(50000+10000+10000)/3600=77:77 his used.

Appendix C: Degradations and Strengths

Thirty-seven (37) possible degradations were considered with their corresponding strengths. Strengths have been set such that, at their minimum, they were perceptually noticeable by the authors. Note that, in some cases, the strengths chosen below are only one aspect of the whole degradation and that, for other relevant aspects, we randomly sample between empirically chosen values. For instance, for the case of the reverb effect, the SNR was selected as the main strength, but a type of reverb, a width, a delay, etc. is also randomly chosen.

1. Additive noise—With probability 0.29, sample a noise frame from the available pool of noise data sets. Add it to x with an SNR between 35 and −15 dB. Noise data sets include private/proprietary data sets and public data sets such as ESC (K. J. Piczak, "ESC: dataset for environmental sound classification," in Proc. of the ACM Conf on Multimedia (ACM-MM), 2015, pp. 1015-1018. [Online]. Available: https://doi:org/10:7910/DVN/YDEPUT) or FSDNoisy18k (E. Fonseca, M. Plakal, D. P. W. E. Ellis, F. Font, X. Favory, and X. Serra, "Learning sound event classifiers from web audio with noisy labels," ArXiv: 1901.01189, 2019. [Online]. Available: https://doi:org/10:5281/zenodo:2529934). This degradation can be applied to the whole frame or, with probability 0.25, to just part of it (minimum 300 ms).
2. Colored noise—With probability 0.07, generate a colored noise frame with uniform exponent between 0 and 0.7. Add it to x with an SNR between 45 and −15 dB. This degradation can be applied to the whole frame or, with probability 0.25, to just part of it (minimum 300 ms).
3. Hum noise—With probability 0.035, add tones around 50 or 60 Hz (sine, sawtooth, square) with an SNR between 35 and −15 dB. This degradation can be applied to the whole frame or, with probability 0.25, to just part of it (minimum 300 ms).
4. Tonal noise—With probability 0.011, same as before but with frequencies between 20 and 12,000 Hz.
5. Resampling—With probability 0.011, resample the signal to a frequency between 2 and 32 kHz and convert it back to 48 kHz.
6. μ-law quantization—With probability 0.011, apply μ-law quantization between 2 and 10 bits.
7. Clipping—With probability 0.011, clip between 0.5 and 99% of the signal.
8. Audio reverse—With probability 0.05, temporally reverse the signal.
9. Insert silence—With probability 0.011, insert between 1 and 10 silent sections of lengths between 20 and 120 ms.
10. Insert noise—With probability 0.011, same as above but with white noise.
11. Insert attenuation—With probability 0.011, same as above but attenuating the section by multiplying by a maximum linear gain of 0.8.
12. Perturb amplitude—With probability 0.011, same as above but inserting multiplicative Gaussian noise.
13. Sample duplicate—With probability 0.011, same as above but replicating previous samples.
14. Delay—With probability 0.035, add a delayed version of the signal (single- and multi-tap) using a maximum of 500 ms delay.
15. Extreme equalization—With probability 0.006, apply an equalization filter with a random Q and a gain above 20 dB or below −20 dB.
16. Band-pass—With probability 0.006, apply a band-pass filter with a random Q at a random frequency between 100 and 4,000 Hz.
17. Band-reject—With probability 0.006, same as above but rejecting the band.
18. High-pass—With probability 0.011, apply a high-pass filter at a random cutoff frequency between 150 and 4,000 Hz.
19. Low-pass—With probability 0.011, apply a low-pass filter at a random cutoff frequency between 250 and 8,000 Hz.
20. Chorus—With probability 0.011, add a chorus effect with a linear gain between 0.15 and 1.
21. Overdrive—With probability 0.011, add an overdrive effect with a gain between 12 and 50 dB.
22. Phaser—With probability 0.011, add a phaser effect with a linear gain between 0.1 and 1.
23. Reverb—With probability 0.035, add reverberation with an SNR between −5 and 10 dB.
24. Tremolo—With probability 0.011, add a tremolo effect with a depth between 30 and 100%.
25. Griffin-Lim reconstruction—With probability 0.023, perform a Griffin-Lim reconstruction of an STFT of the signal. The STFT is computed using random window lengths and 50% overlap.
26. Phase randomization—With probability 0.011, same as above but with random phase information.
27. Phase shuffle—With probability 0.011, same as above but shuffling window phases in time.
28. Spectrogram convolution—With probability 0.011, convolve the STFT of the signal with a 2D kernel. The STFT is computed using random window lengths and 50% overlap.
29. Spectrogram holes—With probability 0.011, apply dropout to the spectral magnitude with probability between 0.15 and 0.98.
30. Spectrogram noise—With probability 0.011, same as above but replacing 0s by random values.
31. Transcoding MP3—With probability 0.023, encode to MP3 and back, using libmp3lame and between 2 and 96 kbps (all codecs come from ffmpeg).
32. Transcoding AC3—With probability 0.035, encode to AC3 and back using between 2 and 96 kbps.
33. Transcoding EAC3—With probability 0.023, encode to EAC3 and back using between 16 and 96 kbps.
34. Transcoding MP2—With probability 0.023, encode to MP2 and back using between 32 and 96 kbps.
35. Transcoding WMA—With probability 0.023, encode to WMA and back using between 32 and 128 kbps.
36. Transcoding OGG—With probability 0.023, encode to OGG and back, using libvorbis and between 32 and 64 kbps.
37. Transcoding OPUS—With probability 0.046, encode to OPUS and back, using libopus and between 2 and 64 kbps.

Appendix D: Considered Approaches

The present disclosure is compared to 9 existing approaches:

1. ITU-P563 (L. Malfait, J. Berger, and M. Kastner, "P.563—The ITU-T standard for single-ended speech quality assessment," IEEE Trans. On Audio, Speech and Language Processing, vol. 14, no. 6, pp. 1924-1934, 2010)—This is a reference-free standard designed for narrowband telephony. It was chosen because it was the best match for a reference-free standard that we had access to. The produced scores were directly used.
2. FL-JND—Inspired by Manocha et al. (P. Manocha, A. Finkelstein, Z. Jin, N. J. Bryan, R. Zhang, and G. J. Mysore, "A differentiable perceptual audio metric learned from just noticeable differences," ArXiv: 2001.04460, 2020), the proposed encoder architecture was implemented and trained on the JND task. Next, for each data set, a small MLP was trained with a sigmoid output that takes latent features from all encoder layers as input and predicts quality scores.

3. FL-PASE—A PASE encoder (S. Pascual, M. Ravanelli, J. Serra, A. Bonafonte, and Y. Bengio, "Learning problem-agnostic speech representations from multiple self-supervised tasks," in Proc. of the Int. Speech Comm. Assoc. Conf. (INTERSPEECH), 2019, pp. 161-165) was trained with the tasks of JND, DT, and speaker identification. Next, for each data set, a small MLP was trained with a sigmoid output that takes latent features from the last layer as input and predicts quality scores.
4. SRMR (T. H. Falk, C. Zheng, and W.-Y. Chan, "A non-intrusive quality and intelligibility measure of reverberant and dereverberated speech," IEEE Trans. on Audio, Speech, and Language Processing, vol. 18, no. 7, pp. 1766-1774, 2010)—The measure from https://github:com/jfsantos/SRMRpy was used and employed a small MLP with a sigmoid output to adapt it to the corresponding data set.
5. AutoMOS (B. Patton, Y. Agiomyrgiannakis, M. Terry, K. Wilson, R. A. Saurous, and D. Sculley, "AutoMOS: learning a non-intrusive assessor of naturalness-of-speech," in NIPS16 End-to-end Learning for Speech and Audio Processing Workshop, 2016)—The approach was re-implemented, but the synthesized speech embeddings and its auxiliary loss were substituted by $L^{MR}$.
6. Quality-Net (S.-W. Fu, Y. Tsao, H.-T. Hwang, and H.-M. Wang, "Quality-Net: an end-to-end non-intrusive speech quality assessment model based on BLSTM," in Proc. of the Int. Speech Comm. Assoc. Conf. (INTERSPEECH), 2018, pp. 1873-1877)—The proposed approach was re-implemented.
7. WEnets (A. A. Catellier and S. D. Voran, "WEnets: a convolutional framework for evaluating audio waveforms," ArXiv:1909.09024, 2019)—The proposed approach was adapted to regress MOS.
8. CNN-ELM (H. Gamper, C. K. A. Reddy, R. Cutler, I. J. Tashev, and J. Gehrke, "Intrusive and non-intrusive perceptual speech quality assessment using a convolutional neural network," in IEEE Workshop on Applications of Signal Processing to Audio and Acoustics (WASPAA), 2019, pp. 85-89)—The proposed approach was re-implemented.
9. NISQA (G. Mittag and S. Möller, "Non-intrusive speech quality assessment for super-wideband speech communication networks," in Proc. of the IEEE Int. Conf. on Acoustics, Speech and Signal Processing (ICASSP), 2019, pp. 7125-7129)—The proposed approach was adapted to work with MOS, and the auxiliary POLQA loss was substituted by $L^{MR}$.

The invention claimed is:

1. A method of training a neural-network-based system for determining an indication of an audio quality of an audio input, the method comprising:

obtaining, as input, at least one training set comprising audio samples, wherein the audio samples comprise audio samples of a first type and audio samples of a second type, wherein each of the first type of audio samples is labelled with information indicative of a respective predetermined audio quality metric, and wherein each of the second type of audio samples is labelled with information indicative of a respective audio quality metric relative to that of a reference audio sample;

inputting the audio samples of the training set to the neural-network-based system including:

a neural-network-based encoder configured to map an audio sample to a respective latent vector in a latent space, and a neural-network-based assessment stage including a first assessment head and one or more second assessment heads, the first assessment head being configured to generate a respective quality score corresponding to the audio sample based on the respective latent vector; and iteratively training the neural-network-based system to predict the respective label information of the audio samples in the training set based on a plurality of loss functions, wherein each of the loss functions is configured to reflect differences between the respective label information of the audio samples in the training set and the respective predictions thereof generated by a respective one of the assessment heads; and wherein the one or more second assessment heads and a corresponding subset of the plurality of loss functions are configured to regularize the latent space based on a plurality of respective latent vectors to which the audio samples of the training set are mapped during the iterative training.

2. The method according to claim 1, wherein the first type of audio samples comprises human annotated audio samples, each being labelled with the information indicative of the respective predetermined audio quality metric, wherein the human annotated audio samples comprise mean opinion score, MOS, audio samples and/or just-noticeable difference, JND, audio samples.

3. The method according to claim 2, wherein the second type of audio samples comprises algorithmically generated audio samples, each being labelled with the information indicative of the relative audio quality metric.

4. The method according to claim 3, wherein each of the algorithmically generated samples is generated by selectively applying at least one degradation function, each with a respective degradation strength, to a reference audio sample or to another algorithmically generated audio sample, and wherein the label information comprises information indicating the respective degradation function and/or the respective degradation strength that have been applied thereto.

5. The method according to claim 4, wherein the label information further comprises information indicative of degradation relative to the reference audio sample or to the other audio sample in the training set, wherein the degradation function is selected from a plurality of available degradation functions, and/or wherein the respective degradation strength is set such that, at its minimum, the degradation is perceptually noticeable.

6. The method according to claim 5, wherein the plurality of available degradation functions comprises functions relating to one or more of: reverberation, clipping, encoding with different codecs, phase distortion, audio reversing, and background noise.

7. The method according to claim 4, wherein the algorithmically generated audio samples are generated as pairs of audio frames $\{x_i, x_j\}$ and/or quadruples of audio frames $\{x_{i_k}, x_{i_l}, x_{j_k}, x_{j_l}\}$, wherein the audio frame $x_i$ is generated by selectively applying at least one degradation function each with a respective degradation strength to a reference audio frame, wherein the audio frame $x_j$ is generated by selectively applying at least one degradation function each with a respective degradation strength to the audio frame $x_i$, wherein the audio frames $x_{i_k}$ and $x_{i_l}$ are extracted from audio frame $x_i$ by selectively applying a respective time delay to the audio frame $x_i$, and wherein the audio frames $x_{j_k}$ and $x_{j_l}$ are extracted from audio frame $x_j$ by selectively applying a respective time delay to the audio frame $x_j$.

8. The method according to claim 3, wherein the label information of the second type of audio samples comprises relative information indicative of whether one audio sample is more degraded than another audio sample, wherein the plurality of loss functions comprises a loss function indicative of a pairwise ranking metric and calculated based on a ranking established by the label information comprising the relative degradation information and the prediction thereof.

9. The method according to claim 3, wherein the label information of the second type of audio samples comprises relative information indicative of perceptual relevance between audio samples, wherein the plurality of loss functions comprises a loss function indicative of a consistency metric, wherein the consistency metric indicates whether two or more audio samples have the same degradation function and degradation strength, and correspond to the same time frame, and wherein the loss function is calculated based on the difference between the label information comprising the perceptual relevance information and the prediction thereof.

10. The method according to claim 3, wherein the label information of the second type of audio samples comprises relative information indicative of whether one audio sample has been applied with the same degradation function and the same degradation strength as another audio sample, wherein the plurality of loss functions comprises a loss function indicative of a degradation condition metric, and wherein the loss function is calculated based on the difference between the label information comprising the relative degradation information and the prediction thereof.

11. The method according to claim 3, wherein the label information of the second type of audio samples comprises relative information indicative of perceptual difference relative to one another, wherein the plurality of loss functions comprises a loss function indicative of a JND metric, and wherein the loss function is calculated based on the difference between the label information comprising the relative perceptual difference and the prediction thereof.

12. The method according to claim 3, wherein the label information of the second type of audio samples comprises information indicative of the degradation function that has been applied to the audio sample, wherein the plurality of loss functions comprises a loss function indicative of a degradation type metric, and wherein the loss function is calculated based on difference between the label information comprising the respective degradation function information and the prediction thereof.

13. The method according to claim 3, wherein the label information of the second type of audio samples comprises information indicative of the degradation strength that has been applied to an audio sample, wherein the plurality of loss functions comprises a loss function indicative of a degradation strength metric, and wherein the loss function is calculated based on difference between the label information comprising the respective degradation strength information and the prediction thereof.

14. The method according to claim 3, wherein the plurality of loss functions comprises a loss function indicative of a regression metric, and wherein the regression metric is calculated according to at least one of reference-based and/or reference-free quality measures, wherein the reference-based quality measures comprise at least one of: PESQ, CSIG, CBAK, COVL, SSNR, LLR, WSSD, STOI, SISDR, Mel cepstral distortion, and log-Mel-band distortion.

15. The method according to claim 1, wherein each of the assessment heads comprises a respective linear layer or a respective multilayer perceptron, MLP.

16. A neural-network-based system for determining an indication of an audio quality of an input audio sample, wherein the neural-network-based system comprises:

a neural-network-based encoder configured to map the input audio sample to a respective latent vector in a latent space; and a neural-network-based assessment stage including a first assessment head and one or more second assessment heads, wherein the first assessment head is configured to generate a respective quality score corresponding to the input audio sample based on the respective latent vector; and wherein the one or more second assessment heads are configured to regularize the latent space based on a plurality of latent vectors to which audio samples of a training set are mapped by the neural-network-based encoder during iterative training of the neural-network-based system.

17. A method of operating a neural-network-based system for determining an indication of an audio quality of an input audio sample, wherein the system comprises a neural-network-based encoder and a neural-network-based assessment stage including a plurality of assessment heads, the method comprising:

mapping, by the neural-network-based encoder, the input audio sample to a respective latent vector in a latent space; and predicting for the input audio sample, by a first subset of the plurality of assessment heads of the neural-network-based assessment stage, information indicative of a predetermined audio quality metric, and by a second subset of the plurality of assessment heads of the neural-network-based assessment stage, information indicative of a relative audio quality metric relative to a reference audio sample, wherein the predicting by the first and second subsets of the plurality of assessment heads is based on the respective latent vector.

* * * * *